US012770004B2

(12) United States Patent
Long et al.

(10) Patent No.: US 12,770,004 B2
(45) Date of Patent: Oct. 20, 2026

(54) AUTOMATIC DEVELOPMENT AND ENHANCEMENT OF DEEP LEARNING MODEL FOR DATA EXTRACTION USING FEEDBACK LOOP

(71) Applicant: ICE Mortgage Technology, Inc., Pleasanton, CA (US)

(72) Inventors: Yuelin Long, Pleasanton, CA (US); Amit Pradeep Joglekar, Pleasanton, CA (US); Prabhakar Gundugola, Dublin, CA (US); Naman Agarwal, Pune (IN)

(73) Assignee: ICE Mortgage Technology, Inc., Pleasanton, CA (US)

( * ) Notice: Subject to any disclaimer, the term of this patent is extended or adjusted under 35 U.S.C. 154(b) by 0 days.

(21) Appl. No.: 18/503,777

(22) Filed: Nov. 7, 2023

(65) Prior Publication Data

US 2025/0148278 A1 May 8, 2025

(51) Int. Cl.
*G06N 3/08* (2023.01)
*G06N 3/091* (2023.01)
(Continued)

(52) U.S. Cl.
CPC ............... *G06N 3/08* (2013.01); *G06N 3/091* (2023.01); *G06N 20/00* (2019.01); *G06V 30/00* (2022.01);
(Continued)

(58) Field of Classification Search
CPC .......... G06N 3/08; G06N 3/091; G06N 20/00; G06V 30/00; G06V 30/10; G06V 30/12; G06V 30/127; G06V 30/133
See application file for complete search history.

(56) References Cited

U.S. PATENT DOCUMENTS 11,055,484 B1 * 7/2021 Jansz ...................... G06F 16/93
11,842,035 B2 * 12/2023 Jahjah .................... G06N 20/00
(Continued)

FOREIGN PATENT DOCUMENTS

EP 3882814 B1 * 6/2025 ............... G06N 3/09
WO WO-2024058771 A1 * 3/2024 ............ G06N 20/20

OTHER PUBLICATIONS

Culotta et al., "Corrective feedback and persistent learning for information extraction", 2006, Artificial Intelligence, vol. 170 No. 14-15, pp. 1101-1122 (Year: 2006).*
(Continued)

*Primary Examiner* — Abdullah Al Kawsar
(74) *Attorney, Agent, or Firm* — DLA Piper LLP (US)

(57) ABSTRACT

Systems and methods for deep learning model development for data extraction using a feedback loop. A system generates an interactive graphical user interface (GUI) on one or more user devices for displaying a document with data extracted from the document by a data extraction model together with a user interaction tool allowing the user to correct the extracted data. The system receives, via the interactive GUI, correction information for the extracted data and monitoring performance characteristics of the extraction model in real-time based on the user correction information. The system automatically updates and trains the extraction model using the correction information responsive to detecting that the performance characteristics meet a predetermined performance reduction condition.

28 Claims, 17 Drawing Sheets

(51) Int. Cl.

*G06N 20/00* (2019.01)
*G06V 30/00* (2022.01)
*G06V 30/10* (2022.01)
*G06V 30/12* (2022.01)

(52) U.S. Cl.

CPC .............. *G06V 30/10* (2022.01); *G06V 30/12* (2022.01); *G06V 30/127* (2022.01); *G06V 30/133* (2022.01)

(56) References Cited

U.S. PATENT DOCUMENTS

| | | | | |
|---|---|---|---|---|
| 2014/0181114 | A1* | 6/2014 | Schuster | G06F 16/38 707/754 |
| 2018/0268506 | A1* | 9/2018 | Wodetzki | G06F 15/76 |
| 2019/0220660 | A1* | 7/2019 | Cali | G06V 30/40 |
| 2019/0286541 | A1* | 9/2019 | Sobala | G06F 11/3447 |
| 2020/0110930 | A1* | 4/2020 | Simantov | G06Q 30/04 |
| 2020/0210490 | A1* | 7/2020 | Hutchins | G06V 30/412 |
| 2020/0226364 | A1* | 7/2020 | Gehler | G06Q 50/14 |
| 2020/0327352 | A1* | 10/2020 | Brandt | G06V 10/82 |
| 2021/0073627 | A1* | 3/2021 | Sarferaz | G06N 3/08 |
| 2021/0165817 | A1* | 6/2021 | Zeiler | G06F 16/48 |
| 2021/0232981 | A1* | 7/2021 | Sundaresan | G06F 18/2148 |
| 2021/0365677 | A1* | 11/2021 | Anzenberg | G06N 3/044 |
| 2021/0397737 | A1* | 12/2021 | De Berker | G06V 30/416 |
| 2022/0101068 | A1* | 3/2022 | Zlotnick | G06F 18/2433 |
| 2022/0156300 | A1* | 5/2022 | Paruchuri | G06V 10/82 |
| 2022/0230013 | A1* | 7/2022 | Krishnamurthy | G06V 10/25 |
| 2024/0095397 | A1* | 3/2024 | Knuesel | G06F 21/6245 |

OTHER PUBLICATIONS

Schuster et al., "Intellix—End-User Trained Information Extraction for Document Archiving", 2013, 2013 12th International Conference on Document Analysis and Recognition, vol. 12 (2013), pp. 101-105 (Year: 2013).*

Hanke et al., "Continuous User Feedback Learning for Data Capture from Business Documents", 2012, Hybrid Artificial Intelligent Systems: 7th International Conference, vol. 7, pp. 538-549 (Year: 2012).*

* cited by examiner

400

440

The University of North Carolina at Chapel Hill
103 South Building, Campus Box 9100
Chapel Hill, NC 27599-9100

| | |
|---|---|
| Pay Group: | SPN-SHRA Non-Exempt |
| Pay Begin Date: | 07/10/2017 |
| Pay End Date: | 07/23/2017 |

| | |
|---|---|
| Business Unit: | UNCCH |
| Advice #: | 000000002214873 |
| Advice Date: | 08/24/2017 |

Employee Name
123 Franklin St
CHAPEL HILL, NC 27517

| | |
|---|---|
| Employee ID: | 000000000 |
| Department: | 260108-WSEE-HR Information Mgmt |
| Location: | OHR-Ofc of the Vice Chancellor |
| Job Title: | Admin Support Specialist |
| Pay Rate: | $45,000.00 Annual |

| **TAX DATA:** | **Federal** | **NC State** |
|---|---|---|
| Tax Status: | Single | Single |
| Allowances: | 0 | 0 |
| Addl. Percent: | | |
| Addl. Amount: | | |

HOURS AND EARNINGS

| | | Current | | YTD | |
|---|---|---|---|---|---|
| **Description** | **Rate** | **Hours** | **Earnings** | **Hours** | **Earnings** |
| Regular | 20.346846 | 74.50 | 1,515.84 | 855.00 | 17,446.65 |
| Sick | 20.346846 | 3.50 | 71.21 | 19.50 | 395.51 |
| Bonus Leave | 20.346846 | 2.00 | 40.69 | 16.00 | 325.27 |
| Adverse Weather Cond III Close | | | 0.00 | 3.00 | 60.81 |
| Civil Leave | | | 0.00 | 8.00 | 162.23 |
| Holiday | | | 0.00 | 72.00 | 1,459.97 |
| MobileCommunication Device-$70 | | | 0.00 | | 560.00 |
| Overtime @ .50 Time | | | 0.00 | 14.50 | 147.50 |
| Overtime - Straight Time | | | 0.00 | 14.50 | 295.04 |
| Regular (Overtime Week) | | | 0.00 | 360.00 | 7,296.84 |
| Vacation | | | 0.00 | 27.50 | 557.39 |
| **TOTAL:** | | **80.00** | **1,627.74** | **1,390.00** | **28,707.21** |

TAXES

| **Description** | **Current** | **YTD** |
|---|---|---|
| Fed Withholding | 182.98 | 3,319.78 |
| Fed MED/EE | 22.12 | 394.81 |
| Fed OASDI/EE | 94.58 | 1,688.15 |
| NC Withholding | 61.00 | 1,126.00 |
| **TOTAL:** | **360.68** | **6,528.74** |

FIG. 4C

460

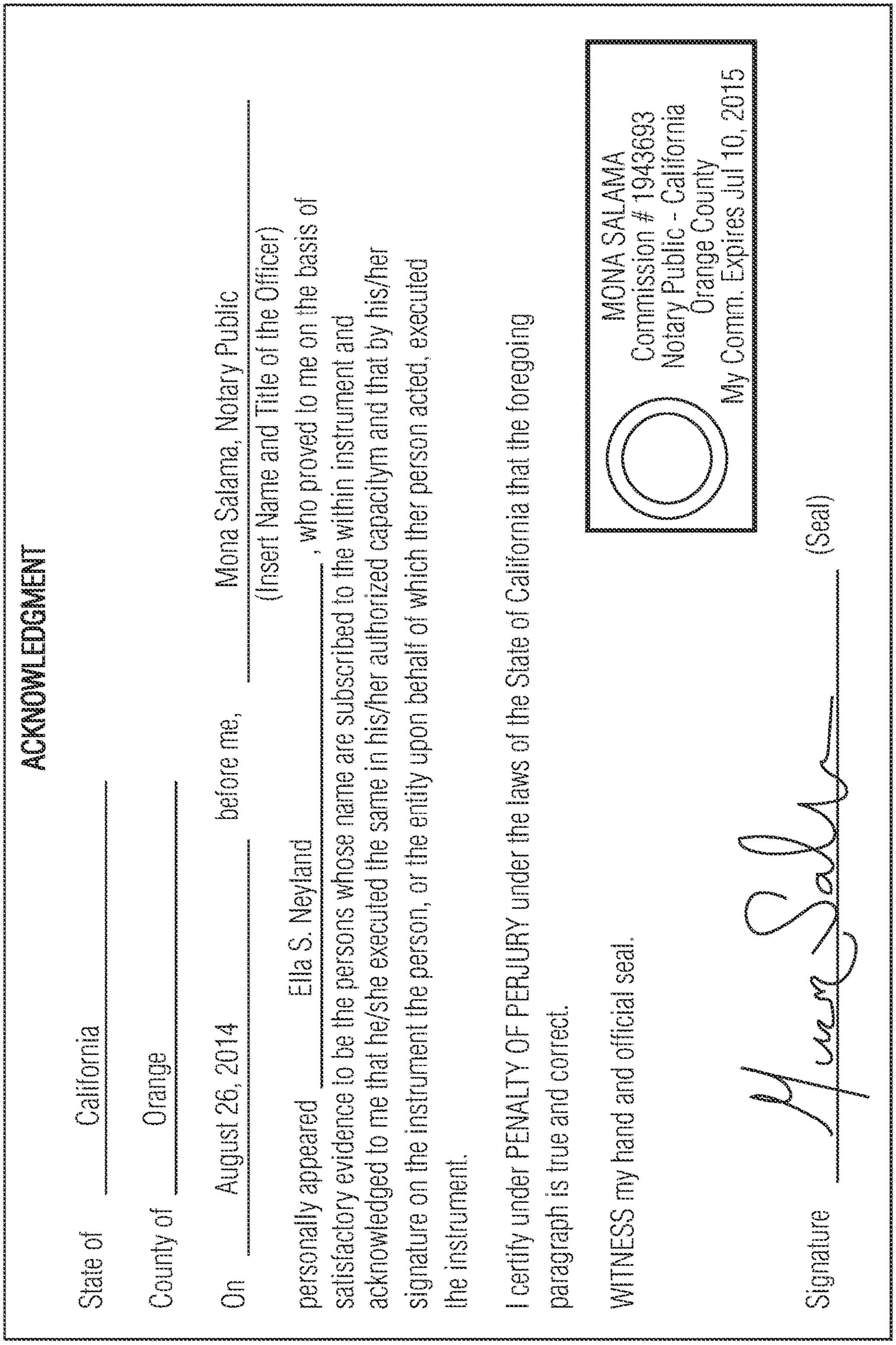

ACKNOWLEDGMENT

State of California

County of Orange

On August 26, 2014 before me, Mona Salama, Notary Public
(Insert Name and Title of the Officer)

personally appeared Ella S. Neyland, who proved to me on the basis of satisfactory evidence to be the persons whose name are subscribed to the within instrument and acknowledged to me that he/she executed the same in his/her authorized capacitym and that by his/her signature on the instrument the person, or the entity upon behalf of which ther person acted, executed the instrument.

I certify under PENALTY OF PERJURY under the laws of the State of California that the foregoing paragraph is true and correct.

WITNESS my hand and official seal.

MONA SALAMA
Commission # 1943693
Notary Public - California
Orange County
My Comm. Expires Jul 10, 2015

Signature (Seal)

FIG. 4D

AUTOMATIC DEVELOPMENT AND ENHANCEMENT OF DEEP LEARNING MODEL FOR DATA EXTRACTION USING FEEDBACK LOOP

TECHNICAL FIELD

The present disclosure generally relates to systems and methods for developing and enhancing deep learning models for performing data extraction from unstructured document images.

BACKGROUND

Problems exist in the field of automatic data extraction (ADE) systems that utilize deep learning models to extract unstructured data from various documents. These problems are rooted in the training, evaluation and deployment of the deep learning models. For example, conventional ADE training systems are typically tedious and time-consuming, involving intense computational processing, and may further involve several iterations of numerous manual user interactions through the process (e.g., document identification, document collection, labeling of documents for training, as well as model building, evaluation and deployment). Thus, the conventional procedure is prone to human errors (e.g., in labeling documents, in model building, in model evaluation, etc.), and may generate substantial time delay between training and deployment of the model due to various human tasks performed in the training pipeline combined with the computational processing utilized to build and train the model itself. As another example, problems also exist in updating existing models. Updating conventional ADE systems may also be tedious, time-consuming and may include manual involvement. For example, conventional systems may fail to identify any model errors and/or may identify an error only after some delay; thus making the updating procedure prone to human error and substantial delay between training and deployment of an updated model (if an error is in fact identified).

Accordingly, there is a need for systems and methods for reducing the number of steps in training and deploying deep learning models, as well as automating steps where possible and improving the updating of deep learning models to efficiently identify prediction errors and generate robust models adaptable to prediction errors.

SUMMARY

Aspects of the present disclosure relate to systems, methods and non-transitory computer readable mediums for developing and enhancing deep learning models for performing data extraction from unstructured document images.

Aspects of the present disclosure also relate to systems including one or more databases configured to store one or more documents together with data automatically extracted from each document via at least one extraction model comprising a machine learning (ML) model, and at least one server operatively coupled to the one or more databases. The at least one server includes one or more processors and a memory storing computer-readable instructions executable by the one or more processors. The memory stories the at least one extraction model. The at least one server is configured to generate an interactive graphical user interface (GUI) on one or more user devices. The interactive GUI is configured to display, for a document of the one or more documents, the document together with one or more extracted data indications associated with the respective extracted data and user interaction tools to indicate any user correction information associated with the one or more extracted data indications. The at least one server is also configured to store, in the one or more databases, user correction information received from the one or more user devices via the user interaction tools of the interactive GUI for the one or more documents, such that each of the one or more documents, the respective extracted data and the corresponding user correction information form an extracted document dataset. Each extracted document dataset is updated as corresponding new user correction information is received. The at least one server is also configured to monitor, in real-time, performance characteristics of the at least one extraction model based on the user correction information in each extracted document dataset, stored in the one or more databases and detect that the monitored performance characteristics meets a predetermined performance reduction condition. Responsive to the detecting, the at least one server is configured to extract at least one particular extracted document dataset associated with the predetermined performance reduction condition from the one or more databases, and automatically update and train the at least one extraction model using the at least one particular extracted document dataset based on the respective user correction information to form at least one new extraction model. The at least one new extraction model is used for executing subsequent data extraction operations.

Aspects of the present disclosure also relate to methods that include storing, by one or more databases, one or more documents together with data automatically extracted from each document via at least one extraction model including a machine learning (ML) model and generating, by at least one server, an interactive graphical user interface (GUI) on one or more user devices. The interactive GUI is configured to display, for a document of the one or more documents, the document together with one or more extracted data indications associated with the respective extracted data and user interaction tools to indicate any user correction information associated with the one or more extracted data indications. The at least one server is operatively coupled to the one or more databases. The at least one server includes one or more processors and a memory storing computer-readable instructions executable by the one or more processors, where the memory stores the at least one extraction model. The method also includes storing, by the at least one server, in the one or more databases, user correction information received from the one or more user devices via the user interaction tools of the interactive GUI for the one or more documents, such that each of the one or more documents, the respective extracted data and the corresponding user correction information form an extracted document dataset. Each extracted document dataset is updated as corresponding new user correction information is received. The method further includes monitoring, by at least one server, in real-time, performance characteristics of the at least one extraction model based on the user correction information in each extracted document dataset, stored in the one or more databases; and detecting, by at least one server, that the monitored performance characteristics meets a predetermined performance reduction condition. Responsive to the detecting, the method further includes extracting, by at least one server, at least one particular extracted document dataset associated with the predetermined performance reduction condition from the one or more databases; and automatically updating and training, by at least one server, the at least one extraction model using the at least one particular extracted document dataset based on the respective user correction information to form at least one new extraction model. The at least one new extraction model is used for executing subsequent data extraction operations.

BRIEF DESCRIPTION OF DRAWINGS

FIGS. 4A, 4B, 4C, 4D, and 4E are screenshots of various example document portions operated on by the data extraction system, according to an aspect of the present disclosure.

DETAILED DESCRIPTION

Figure 1A:
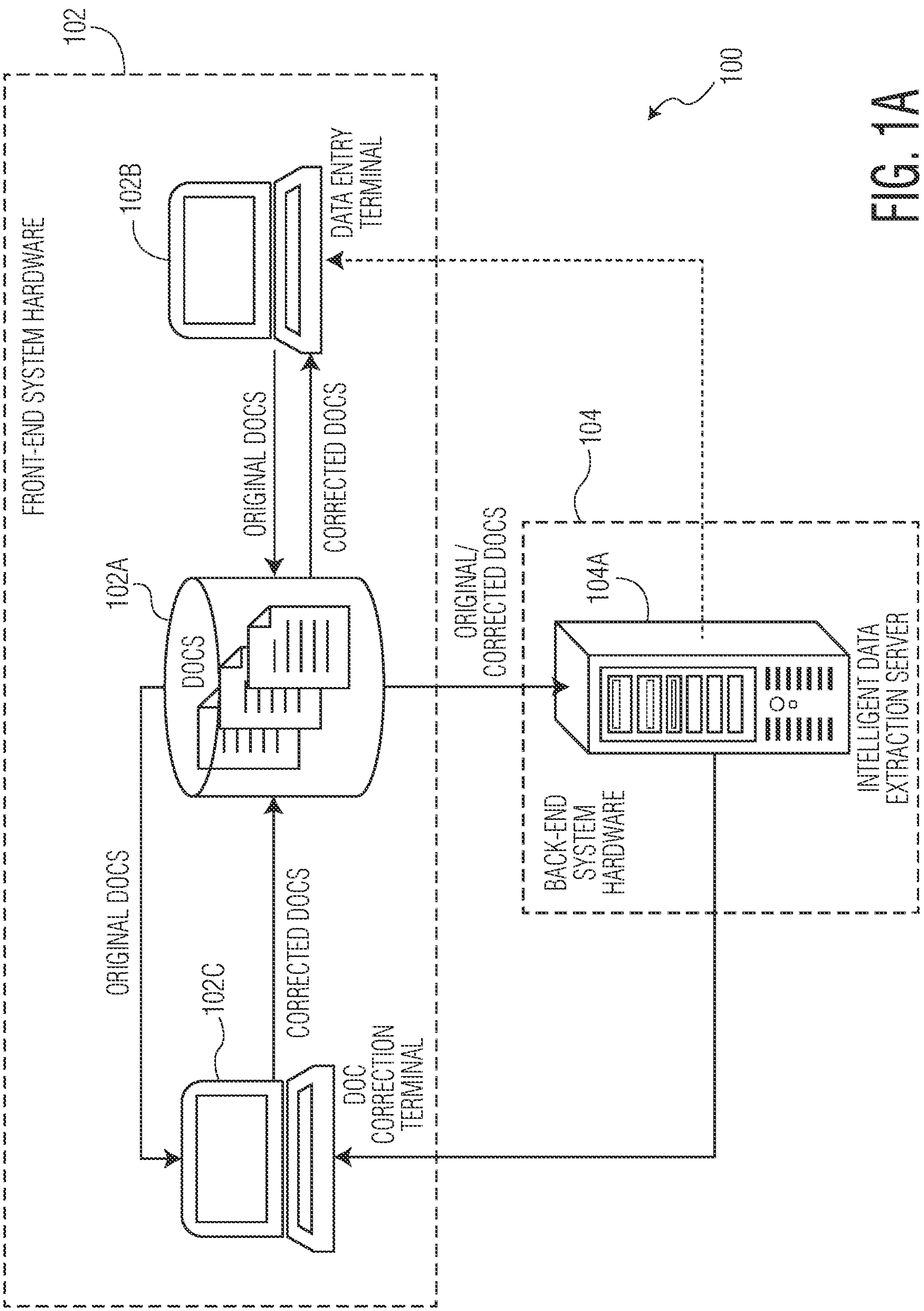
FIG. 1A is a block diagram of an example data extraction system, according to an aspect of the present disclosure.

As discussed above, problems exist in conventional ADE systems especially in the reliance on human involvement in the ADE training pipeline. Examples of conventional ADE training pipeline steps may include, but are not limited to, identifying documents received in production (e.g., real-world samples), collecting qualified documents in production, configuring purpose-built in-house tools for document labeling, manual labeling each field on the document (e.g., the labeling may include entering the text to be extracted and drawing bounding boxes manually around the required fields, etc.), transferring documents with labels to storage for model training, and preprocessing the documents and labeled dataset using manually written code.

In addition, the conventional ADE training procedure may include further data quality assessment steps. For example, a labelling quality assessment may be performed where documents and labeling files are reviewed manually to find problematic images. As another example, a labelling error identification may be performed to check the quality of the images and labeling by viewing the images and labeling, and then manually checking the images, one by one, with limited samples to identify problematic images. Once the data quality has been assessed, object detection models and extraction models may be built using manually written code, and then combined into single model.

In the conventional ADE system, error rates using training samples may then be computed and a baseline model may be evaluated (e.g., by one or more of, without being limited to calculating a weighted average of field-level accuracy, character-wise accuracy on both text and snippets, and confidence levels). Incorrect predictions may be manually investigated to determine why the model is not accurately predicting extracted data. If the issue is due to the labelling, the training steps may be repeated recurrently until the model performance is improved. As used herein, a character may be defined as a single letter within text, text may be defined a series of characters, and a snippet may be defined as a bounding box of the text. In terms of accuracy, character-level accuracy of text is the percentage of characters predicted correctly out of all characters across all documents. Field-level accuracy is the percentage of fields predicted correctly out of all fields across all documents, i.e., an automation level.

In some examples, one or more steps of the current procedure may be repeated as needed in order to build a desired model with suitable accuracy and automation level above a current accuracy and automation level of the model in production. In some examples, the model may be evaluated on a test data set and then registered in registry if the model performance meets predetermined acceptance criteria. In some examples, additional labeled documents may be used to validate whether the model performance meets acceptance criteria. However, this validation is performed via manually written code, and the result is checked manually to determine whether the model accuracy and automation level meets predetermined acceptance criteria. Once validated, the model may be deployed in production for data extraction.

As is evident, the above-described steps of the conventional ADE training pipeline rely on various manual interactions with humans to perform data labeling, training, evaluation and deployment of the deep learning model, i.e., intelligent neural network-based machine learning models. This results in long end-to-end model update durations that are unable to cope with dynamic environments. This weakness is further exacerbated by the fact that model performance naturally drifts over time and requires frequent updates. In other words, the model may need to be regularly updated based on various factors including but not limited to different formats of documents being input to the ADE system. This means the above manual steps of the conventional ADE training pipeline need to be repeated.

The present disclosure is the first to enable a "smart ADE system" that provides streamlined and automated deep learning model labeling, training, evaluation and deployment of deep learning models. Specifically, the smart ADE system eliminates numerous steps in the conventional ADE training pipeline and automates remaining steps such that the system automatically creates labeled datasets, continually monitors model performance and trains and automatically updates the model with model updates in response to the monitoring, such that the most up-to-date model may be automatically deployed.

The smart ADE system disclosed herein is a comprehensive and efficient solution that utilizes real-time feedback data from production environments to enhance the accuracy, performance, and adaptability of deep learning models. The smart ADE system includes several interconnected modules working in tandem to automate the training process and continually improve the models. As will be described, these modules may be executed on user devices, server devices, specialized terminals and/or any suitable computing device. Example modules of the smart ADE system are now described, according to an aspect of the present disclosure.

Data Collection Module: The data collection module plays a role in capturing relevant data from production systems. It interfaces with a front-end application where user interactions may be collected in the production environment. The front-end application of the production system may be an application that renders data extracted from scanned documents to perform some task (e.g., tax preparation software that ingests information from tax documents). In some examples, the model(s) utilized may include a combination of a neural network-based ML model and a heuristic rule-based data model (e.g., in circumstances where the neural network-based ML model may not cover or predict certain fields). For example, a deep learning model is an example of a neural network-based ML model that may be trained using production feedback. In some examples, this deep learning model may use transformer-based models and object detection models (described below). A rule-based data model may be utilized as part of a heuristic rule-based data extraction method, in which optical character recognition (OCR) techniques (e.g., using templates with fixed page locations for individual data fields), as well as rule-based OCR model configured with a sequence of if-then rules indicate where to look for specific information in a document. The data collection module employs efficient data ingestion techniques to ensure the continuous and seamless flow of feedback data utilized for model training.

Feedback Preprocessing Module: The collected feedback data may undergo preprocessing to extract unbiased feedback data. The feedback preprocessing module may employ advanced data cleaning techniques (e.g., utilizing custom code with OCR comparison to remove invalid labeling), heuristic sanity checks and orientation and de-skewed methods (as well as any other suitable technique) to transform images from original requests and raw feedback into a suitable format for subsequent model training. The feedback preprocessing functionality may improve the quality and relevance of the feedback data as well as images.

Model Update and Training Module: The model update and training module is responsible for utilizing the processed feedback data and images to train deep learning models accordingly. The module employs various techniques such as (without being limited to) transformer-based large language models, object detection models and ensemble learning to adapt the models. By continuously integrating the feedback data, the module ensures that the models evolve and improve over time. During the model update and training process, the system may employ techniques such as fine-tuning where the pre-trained models are further optimized using the feedback data, or retraining where the models are trained from scratch using a combination of historical and new data. The model update and training module may employ robust optimization algorithms to enhance the models' performance, convergence, and generalization capabilities.

Performance Evaluation Module: The performance evaluation module assesses the updated models based on various predefined benchmarks depending on different end goals of the deep learning models. The module measures various model accuracy metrics (performance characteristics) such as (without being limited to) one or more of character-level accuracy on text, and field-level accuracy on both text and snippet. The module compares the performance of the updated models against the previous iterations or existing production models to determine the effectiveness of the training process. In some examples, part of the preprocessed feedback may be used as ground truth to provide evaluations of the models. In other words, the performance evaluation module may determine whether the model has been effectively trained.

Model Deployment Module: Once the updated models have been evaluated and verified, the model deployment module may integrate the updated models into the backend system (described further below) for further quality assurance testing. The model deployment module may establish the desired infrastructure to facilitate the seamless interaction between the models and real-time data generated by the production systems. The model deployment module may ensure that the deployed models are accessible, scalable, and efficient in processing incoming data streams, providing actionable insights, and making accurate predictions or classifications. The quality assurance testing may include, in non-limiting examples, one or more of functional testing on the backend system itself, model related testing on the correctness model prediction results, and end-to-end testing on the backend system and front-end system combined, which may include (in some examples) both functional testing using sanitized documents and accuracy testing using production documents.

Iterative Loop Module: The iterative loop module may include different triggers to the model update and training module. One type of trigger may be generated by monitoring user feedback pipeline (as well as reference data), to monitor the models in the production environment. If any model drift or data drift is detected, and the performance is less than a performance reduction condition (e.g., a threshold), the module may automatically trigger the model update and training module to bring model performance back to normal (e.g., by generating an updated model). The second type of trigger may include a periodic trigger to the model update and training module to identify any potential improvements of existing models or as part of releasing a new extraction model. The iterative loop module allows the automatic deep learning model training system to operate within an iterative feedback loop. The feedback loop also enables continuous improvement by updating the models on an as-needed basis, using the collected user feedback (described further below). As the user feedback is continuously collected, the usage of this changing and updated information to trigger model training/updates and as part of the training/updating ensure that the models remain adaptable to dynamic production environments and continue to learn and improve over time.

Model drift is the concept of a decay of a model's predictive power as a result of changes in real world environments. Model drift may be caused due to a variety of reasons including non-limiting examples such as changes in the digital environment and ensuing changes in relationships between variables. Model drift may be captured by one or more metrics based on feedback in the monitoring (user feedback) pipeline. Data drift is a covariate shift that may occur when the distribution of the input data changes over time. Data drift can be captured by the metrics based on reference data (examples provided further below) in the monitoring pipeline.

The automatic deep learning model training system provides several advantages over traditional manual labeling and training approaches, making it an indispensable tool in various applications.

One advantage of the system includes reduced manual intervention for labeling and training. The automated nature of the system reduces the need for manual intervention in model training. This allows the various production teams (e.g., labeling, engineering, and operation) to focus on higher-level tasks, as the system handles the collection, preprocessing, updating, and evaluation of models autonomously. This saves time and effort and improves the overall efficiency of the training process. Moreover, the collection of data does not involve any manual interventions that could be interfered by human biases, which makes the results more comprehensive and fairer in developing accurate models.

Another advantage of the system includes real-time adaptation. The system provides a mechanism for real-time adaptation of deep learning models. By incorporating production (user) feedback into the training process, the models can promptly adapt to evolving patterns, trends, and anomalies in the production environment, thereby ensuring optimal performance and relevance in real-world scenarios. The system enables deep learning models to adapt to changing conditions, enhancing their accuracy and performance over time. The continuous integration of relevant feedback ensures that the models stay up-to-date and effective in dynamic production environments.

Another advantage of the system includes enhanced efficiency. By incorporating production feedback, the system is configured to optimize deep learning models, thus reducing the training time and computational resources needed for achieving desirable outcomes.

Further details of the smart ADE system will now be described with respect to the accompanying figures. It should be noted that although specific examples are given with respect to tax-based document extraction, the smart ADE system is applicable to any type of document that may include unstructured or structured data.

Referring to FIG. 1A, a block diagram of example computing environment 100 of the smart ADE system is shown, according to an aspect of the present disclosure. Computing environment 100 may include a front-end 102 and a back-end 104.

Front-end 102 may include one or more storage devices for storing documents and extracted data of the smart ADE system. In one example, front-end 102 may include a document repository 102A for storing unstructured documents (e.g., W2 tax forms) being input to the smart ADE system for data extraction, and extracted information (e.g., data fields with the extracted W2 information) corresponding to these documents.

Front-end 102 may also contain one or more user device (s) for executing the underlying application relying on the integrated smart ADE system. For example, a document intake device (such as data entry terminal 102B) may be included for receiving the original documents to be stored in repository 102A and for displaying the corrected documents. These original documents may be electronic copies of scanned physical documents uploaded by the user in connection with document processing. Alternatively, these documents may also be received through other channels such as file transfer protocol (FTP) servers. In the context of the tax-based document, the W2 form may be scanned by a scanner (not shown) and uploaded via a web portal or a client. In either case, the original documents are uploaded from document intake device (e.g., data entry terminal 102B) and stored in repository 102A.

Front-end 102 may facilitate correction of the extracted data from the uploaded documents, which will be described in more detail below. The corrections of the extracted data from the documents may be performed by a dedicated user device (e.g., data correction terminal 102C) that is operated on by a separate user (e.g., ADE validation application user) performing the corrections after the smart ADE system performs data extraction. In other words, corrections can be made by various users that are ADE specialists tasked to review and validate data extraction results in order to obtain accurate data extraction.

Back-end 104 may include one or more servers 104A to facilitate data extraction and ML model training/updating of the smart ADE system. With respect to the data extraction operations, server(s) 104A retrieves original documents from repository 102A and executes one or more trained extraction models (e.g., an ML model or a sequence of ML models including object detection models and data extraction models) to extract data from the original documents. The data extraction algorithm utilizing the trained extraction model(s) may include different techniques depending on document format. For example, if the document is a scanned document or image, the data extraction algorithm may perform optical character recognition (OCR) based techniques to convert the image-based data into machine readable text. Then, an automated data quality check step may pre-process the image-based documents to reduce noise, convert the image to black and white, correct misalignments, etc. Once pre-processing is complete, the ML model may perform text detection by identifying regions in the document where text is present. Once regions of interest are identified, the ML model may perform character and pattern recognition to identify and extract text. The ML model may then determine categories (extracted data indications) for the extracted data which are then used to populate fields in a structured data format. In the context of a W2 form (representing a non-limiting example), the ML model may extract relevant W2 data such as name, gross income, etc. and populate a machine-readable file with these values. In general, the particular manner in which the data is extracted may depend on the particular extraction model(s).

The data extraction techniques described above, may be executed by one or more machine learning (e.g., deep learning) models that improves accuracy of data extraction. The data extraction ML model(s) may be stored in server(s) 104A and utilized to perform accurate data extraction. In operation, data entry terminal 102B may execute a software application with an integrated smart ADE system for aiding in data extraction of any desired documents. This may include data entry terminal 102B uploading an electronic document (e.g., a scanned copy of an original document) to repository 102A and instructing server(s) 104A to extract data from the document. Upon receiving instructions, server (s) 104A executes one or more trained ML models to process the document to extract data from the document and then populate structured data fields to be presented to the user of data entry terminal 102B or to be processed by another third-party system (not shown). In the context of the non-limiting example of mortgage applications, the user operating data entry terminal 102B may be a mortgage broker, lender, correspondent or an end customer (borrower) that uploads the scanned documents to the software to populate a mortgage application.

As mentioned above, front-end 102 may also include one or more data correction terminals 102C for aiding in the extraction training process of the smart ADE system. In one example, a data correction terminal 102C may be included for reviewing the ADE extracted data in view of the original documents (after extraction processing) stored in repository 102A. For example, a document uploaded from data entry terminal 102B may be operated on by ADE server(s) 104A which performs data extraction based on the trained extraction model(s). The extracted data and corresponding original document may be stored in repository 102A. Data correction terminal 102C then retrieves the extracted data and corresponding original document for display to the user (e.g., an ADE validation application user). The user (e.g., an ADE specialist) may compare the extracted data to the corresponding original document to determine whether the data was accurately extracted. If the data was accurately extracted, data correction terminal 102C confirms the accurate extraction. Alternatively, if the data was inaccurately extracted, the user may utilize data correction terminal 102C to correct the extracted data. This results in an accurate labeled dataset that is associated with the document which may be included in the learning dataset. Although data correction is generally performed by users (such as an ADE validation application user) on a separate computer device, in another example, data entry terminal 102B may communicate with ADE server(s) 104A to additionally operate as a data correction terminal allowing an end user to review the accuracy of the extracted data and make corrections.

In one or more examples, user device(s) in front-end 102 may be operated by a user (not shown). Terminals 102B and 102C may be representative of (without being limited to) a mobile device, a tablet, a desktop computer, a specialized terminal or any suitable computing system having the capabilities described herein. Users may include, but are not limited to, individuals such as, for example, individuals, companies, and or administrators of an entity associated with computing environment 100, such ADE system administrators.

Figure 6:
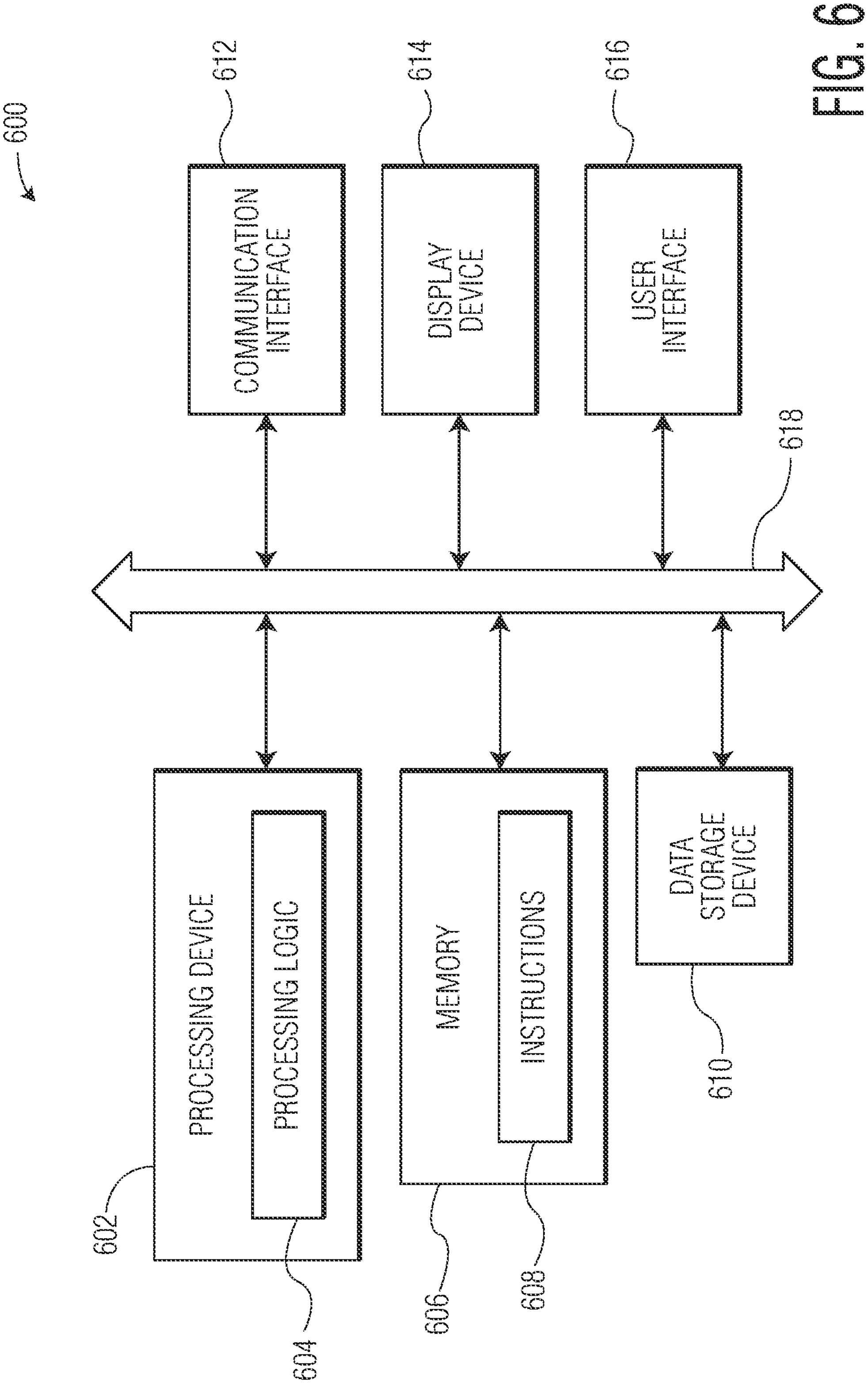
FIG. 6 is a block diagram of an example computer system for executing the data extraction system, according to another aspect of the present disclosure.

In one example, terminals 102B and 102C may include a non-transitory memory, one or more processors including machine readable instructions, a communications interface which may be used to communicate with a server, a user input interface for inputting data and/or information to the user device and/or a user display interface for presenting data and/or information on the user device (such as shown in FIG. 6). In some examples, the user input interface and the user display interface are configured as user interaction tools such as an interactive graphical user interface (GUI) operating on terminals 102B and 102C. The terminals 102B and 102C may also be configured to provide information to or receive information from server(s) 104A, via the interactive GUI.

Figure 1B:
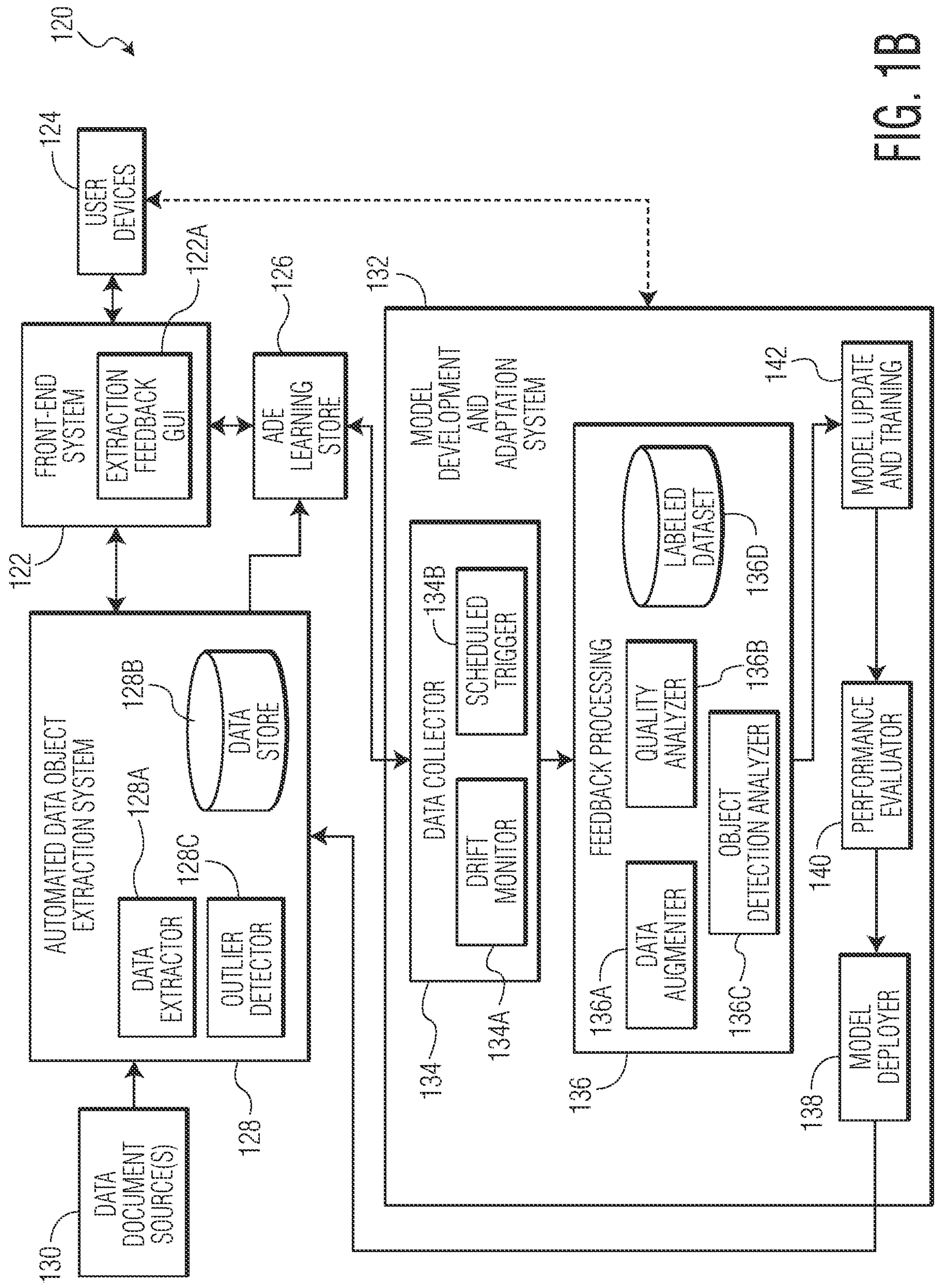
FIG. 1B is another block diagram of the data extraction system, according to an aspect of the present disclosure.

More details of the environment shown in FIG. 1A are now described with respect the block diagram of a computing environment 120 of the smart ADE system shown in FIG. 1B, according to an aspect of the present disclosure.

Computing environment 120 may include a front-end system 122 including an interactive GUI 122A for displaying and correcting extracted data along with receiving feedback from the user (e.g., via one or more user devices 124). The extracted data (e.g., user correction) feedback received via GUI 122A may be validated and then stored in ADE learning store 126 as part of a labeled dataset for use in training the extraction model(s). Computing environment 120 may also include a backend system including an automated data object extraction system 128 that receives documents from document sources 130 and performs data extraction from the documents based on one or more existing extraction models. Part of the backend system may also include model development and adaptation system 132 for training, updating and deploying the extraction model(s) to data object extraction system 128, and ADE learning store 126.

In order to relate the features in FIG. 1B to the hardware in FIG. 1A, it is noted that the automated data object extraction system 128 and the model development and adaptation system 132 of the backend system are generally executed by one or more servers such as server(s) 104A in FIG. 1A. Likewise, the GUI extraction feedback GUI 122A may be executed on one or more of terminals 102C in FIG. 1A. Furthermore, the documents and data from document sources 130, in data store 128B, may be stored in repository 102A in FIG. 1A.

Referring back to FIG. 1B, during operation, one or more existing data extraction models may be deployed from model development and adaptation system 132 to automated data object extraction system 128. In some examples, more than one extraction model may be utilized, for example, different extraction models trained for different specific types of documents. Data extractor 128A may use these model(s) (e.g., ML model(s) and/or heuristic model(s)) to extract data from documents provided by data document source(s) 130. Data extractor 128A sends the extracted data to the front-end system 122, and front-end system 122 is configured to display both the extracted data and the document from which the data was extracted via extraction feedback GUI 122A. Upon receiving feedback (user correction and validation information) from front-end system 122 via the GUI 122A (e.g., corrections to extracted data, corrections to bounding boxes used to extract the data, validation of the corrected data, etc.), the data is stored in data store 128B (and which data may be later sent to ADE learning store 126). It is noted that data store 128B is the data storage used by the front-end application, and it may contain original images and unvalidated extracted data (e.g., data before validation), and/or validated data (e.g., data after validation). In contrast, ADE learning store 126 may store the labeled pairs (e.g., uncorrected and corrected/validated document pairs) used for model training. In some examples, ADE learning store 126 may store further information such as (without being limited to) what type of validation and/or modifications were executed, original extracted results before validation, interim information generated during model prediction, etc. Moreover, ADE learning store 126 may collect and store data for a long period of time, to ensure aggregation of enough samples for model training. Automated data object extraction system 128 may perform other operations to filter out some of the data that may not be useful for training. For example, outlier detector 128C may perform outlier detection to detect extraction results that deviate significantly from the usual results. If so, these outliers may be discarded for training purposes, such that the discarded data is not stored in ADE learning store 126.

While automated data object extraction system 128 and front-end system 122 work in conjunction with one another to extract data and validate extracted data, model development and adaptation system 132 monitors performance of the deployed model(s). For example, data collector 134 (which may be part of the iterative loop module) may include a drift monitor 134A that compares the difference between extraction results generated via 128 and corrections made by the user via the GUI 122A, by monitoring data in ADE learning store 126. An increase in corrections may correlate to drift of the deployed model. If the performance of the model drifts beyond a threshold, and enough training data is available in ADE learning store 126 (i.e., original documents received via document source(s) 130, extracted data generated via data extractor 128A and corrected data generated via front-end system 122), drift monitor 134A may trigger a training update to the model. Drift monitor 134A may also monitor the extracted data in ADE learning store 126 for any data drift, based on reference data (described further below), and may trigger a training update to the model if the data drift meets a predetermined threshold. Drift monitor 134A may be used for ML extraction models updates, such as updating deep learning models.

Data collector 134 may also include scheduled trigger 134B. Trigger 134B may periodically trigger model adaption system 132 to perform model training/updating to identify any potential improvements of existing models or as part of releasing a new extraction model. In some examples, scheduled trigger 134B may be used for deep learning models. Once data collector 134 has determined that model training is to be triggered, data collector 134 may retrieve one or more documents and corresponding user correction feedback for the respective document(s) from ADE learning store 126, and transmit the resulting dataset (e.g., training data to feedback processing 136.

Prior to training, feedback processing 136 of the training data received from data collector 134 may be performed, where data augmenter 136A may augment the training data by correlating document images with its corresponding feedback on extracted data, and preprocessing both images and feedback into a format that can be used by model training, to a labeled dataset. The labeled dataset may be stored in storage 136D. Quality analyzer 136B may check the quality of labeled dataset to remove invalid or corrupted images and labeling that fails quality check, and update the labeled dataset stored in 136. Object detection analyzer 136C may analyze whether object detection should be performed before data extraction and may use this information for updating the model.

After feedback processing by feedback processor 136, and feedback processor 136 determines that enough samples remain for model training (and object detection if such a determination is made by object detection analyzer 136C), processing proceeds to model update and training module 142 (referred to herein as training/update module 142). In training/update module 142 the existing data extraction model(s) (and object detection models if such a determination is made by object detection analyzer 136C) are updated or new models are trained in training/update module 142 using the remaining labeled dataset stored in storage 136D (described further below with respect to FIG. 2B). The performance of newly trained or updated model(s) is then evaluated by performance evaluator 140 (described further below with respect to FIG. 2C). If the updated model(s) meets performance metrics, the model(s) is deployed by model deployer 138, where the deployed (new or updated) model(s) are integrated with automated data object extraction system 128. When received, automated data object extraction system 128 may discard the previous ADE model (s) and start extracting data from subsequent documents using the newly trained ADE model(s). This training process may be repeated as many times as needed as the model/data drifts for existing models and/or may be performed periodically for new models of new documents.

Figure 2A:
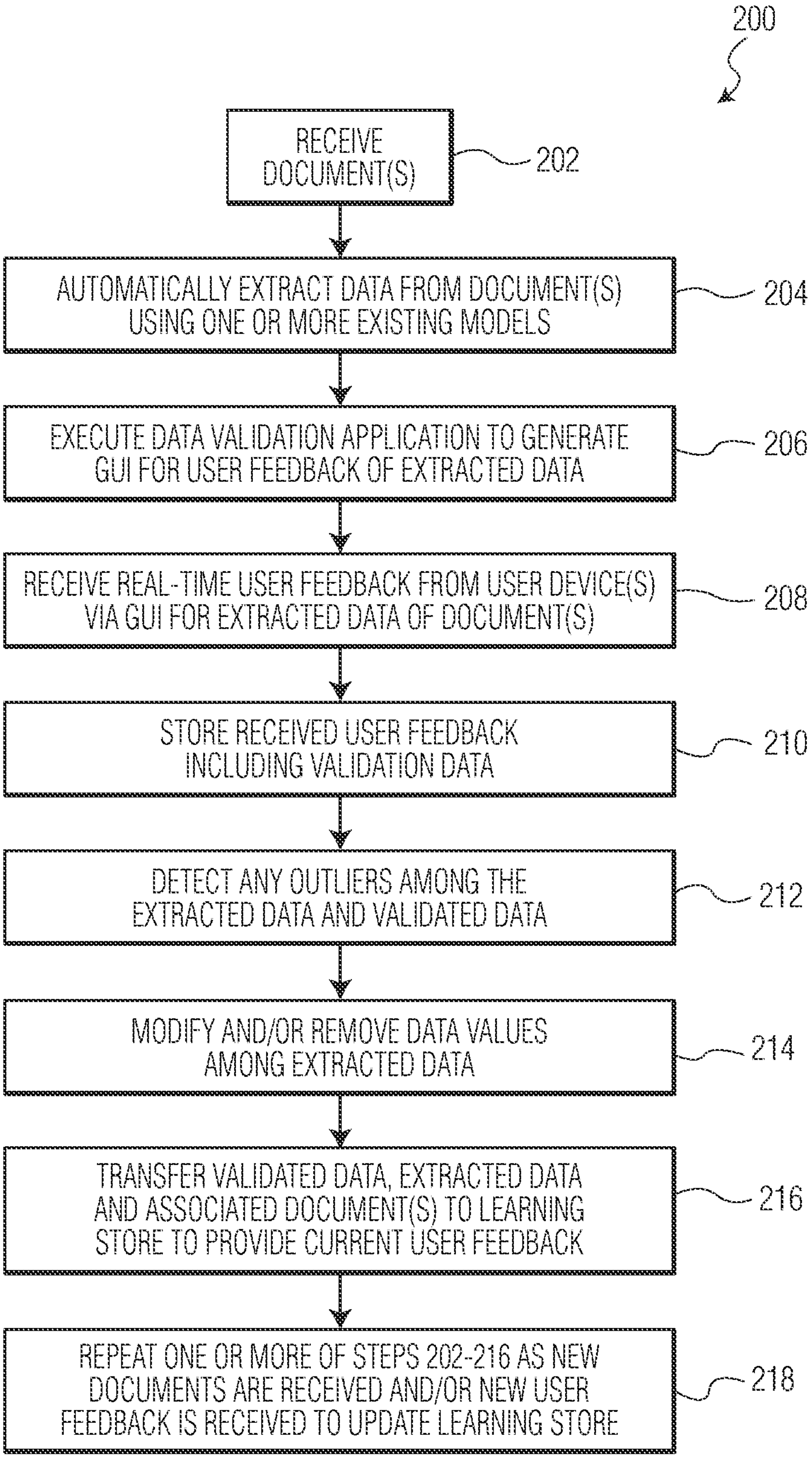
FIG. 2A is a flowchart diagram of an example data extraction method for the data extraction system, according to an aspect of the present disclosure.

Referring to FIG. 2A, a flowchart diagram 200 of an example data extraction method for the data extraction system is shown, according to an aspect of the present disclosure. In some examples, operations shown in flowchart diagram 200 may be performed by automated data object extraction system 128, front-end system 122 and ADE learning store 126. During operation, documents are received in step 202 by the smart ADE system (e.g., via data document source(s) 130). As mentioned above, these documents may be scanned images of physical documents in which data extraction is desired. In step 204, the smart ADE system automatically extracts data from the received documents using one or more existing extraction models (e.g., via data extractor 128A). Specifically, at least one trained and deployed data extraction model is used to scan the document, extract relevant text and populate fields of a structured document with the extracted text. In some examples, the one or more data extraction models may include ML model(s) such as deep learning model(s) and/or heuristic model(s). In some examples, different data extraction models may be used for different types of documents.

In step 206, a data validation application (e.g., an application executed by front-end system 122) is executed to generate an interactive GUI (e.g., extraction feedback GUI 122A) for user feedback of extracted data, so that the extracted data may be validated by the user(s) (e.g., via user device(s) 124). For example, the interactive GUI may present values of the extracted data and the original document to the user for visual inspection. In step 208, real-time user feedback may be received via the GUI for extracted data of one or more documents. The real-time user feedback may include feedback on the extracted data and bounding boxes, and validation information of the extracted data (e.g., feedback that the data is properly extracted and/or feedback that data is incorrectly extracted). In other words, the user may review the extracted data, validate the data as extracted, or modify the extracted data and bounding boxes and perform validation of the modified data and bounding boxes. The received user feedback in step 208 (including the validation data, also referred to herein as correction information) may be stored (e.g., in data store 128B) in step 210. As mentioned above, validation (user correction feedback) may include the end user making modifications to the extracted results. For example, the user may correct the extracted text in the fields and/or modify bounding boxes (that identify the region from where the data was extracted), from the original document.

In step 212, the system may also perform outlier detection (e.g., via outlier detector 128C) to detect any outliers among the extracted data that deviate significantly from expected results. In step 214, the extracted data and outliers may be modified to correct the extracted text in the fields and/or modify bounding boxes so that accurate data can be utilized in model training. In either case, in step 216, the original extracted results and the user correction feedback (validated data) original documents are transferred and stored in a learning store repository (e.g., ADE learning store 126). In step 218, any one or more of steps 202-216 may be repeated as new documents are received or new user feedback is received. In other words, steps 202-216 may be repeated (e.g., in real-time) for numerous documents to obtain enough labeled datasets for training. These labeled datasets may include the extracted text and/or objects and corrections to the extracted text and/or objects.

In some examples, collection and transfer of documents to the learning store repository may be performed in batches to retrieve hundreds of records at once to improve efficiency. The continuous and seamless flow of feedback data may be achieved by real-time streaming. Due to the nature of data validation, production feedback may be generated in real-time, and sent to the learning store repository continuously and seamlessly. In some examples, if any data is unable to be ingested, such errors may be logged with its correlation ID so that it can be found and investigated.

Figure 2B:
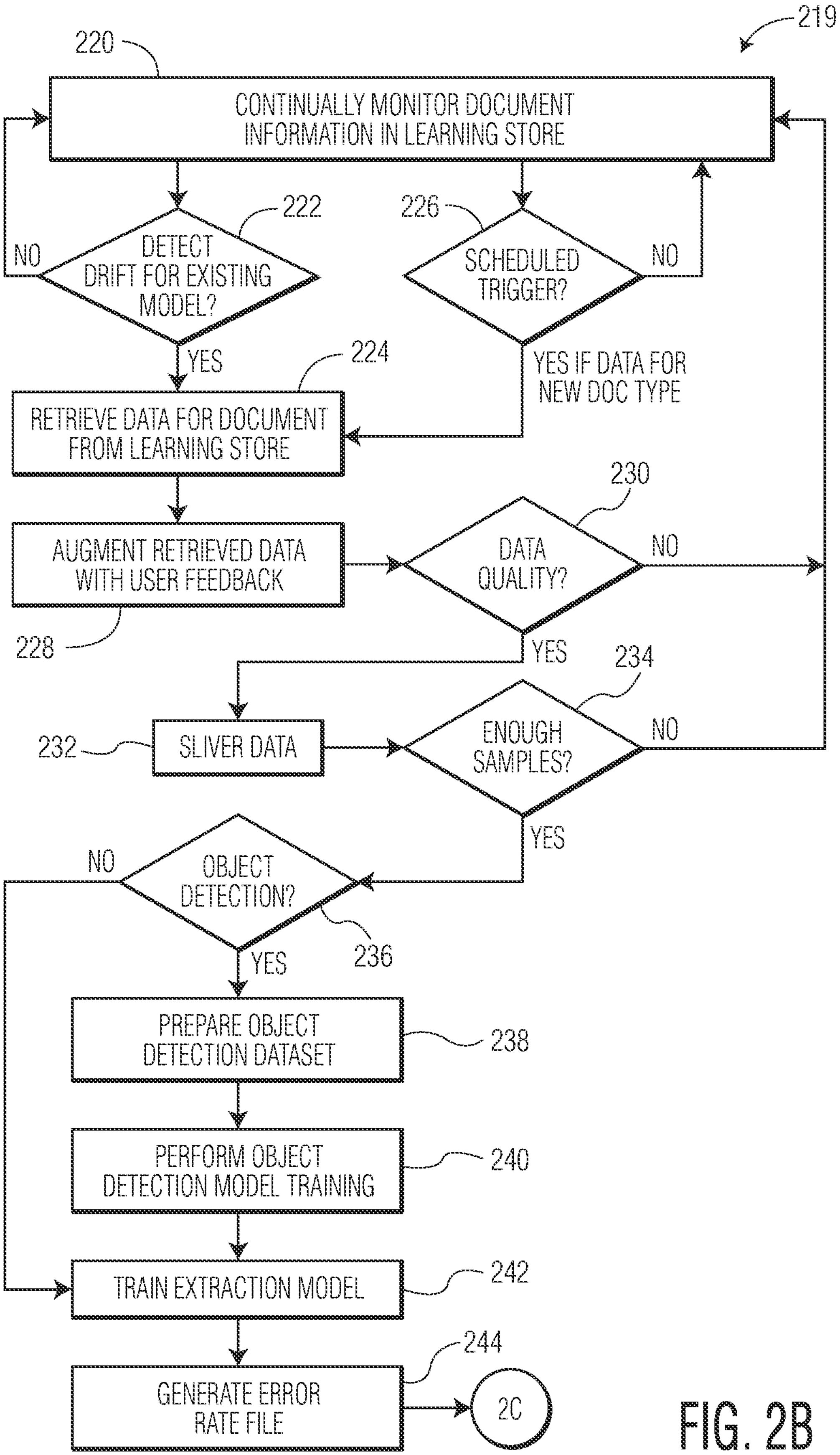
FIG. 2B is a flowchart diagram of an example machine learning model training and updating method for the data extraction system, according to an aspect of the present disclosure.

The ML model training phase is shown in FIG. 2B, where a flowchart diagram 219 of an example of model training for the data extraction system is detailed. In some examples, operations shown in flowchart diagram 219 may be performed by model development and adaptation system 132 in communication with ADE learning store 126. In the remaining description of the data extraction models in FIGS. 2B and 2C, it is assumed that the models are ML models, more specifically deep learning models.

In step 220, the system continually monitors (e.g., via data collector 134) the information in the learning store repository (e.g., ADE learning store 126). This may include monitoring extracted data and user corrections to the extracted data. A training phase for training the ML model may be triggered based various mechanisms such as a schedule (e.g., weekly, monthly, etc.) in step 226 (e.g., via scheduled trigger 134B), or an event triggering in step 222 (e.g., drift monitor 134A). For example, if there is an existing model(s), step 220 will proceed to step 222 to determine whether model and/or data drift are detected (e.g., existing model drift, data drift, etc.). If no drift is detected, then step 222 may proceed to step 220. If drift is detected (in step 222), step 222 may proceed to step 224.

In step 220, the system may also (e.g., via scheduled trigger 134B) proceed to step 226 at a scheduled trigger (e.g., one or more predetermined times, such as periodically, during different stages of the training, etc.). At step 226, it may be determined whether one or more new document type(s) are detected and available for training one or more new models. If a new document type(s) is detected, step 226 may proceed to step 224, so that new model(s) may be trained. If no new document type(s) are detected, step 226 may proceed to step 220.

Events that may trigger the ML model training phase may include model and/or data drift. In other words, the smart ADE system monitors model performance in step 222, and when model performance drifts (e.g., the percentage of prediction errors increases above a predetermined threshold), the smart ADE system may automatically trigger the ML model training phase so that the model can be updated to extract data more accurately from the documents. Model performance may be monitored with one or more aggregated metrics, including metrics based on feedback for model drift (e.g., low intersection over union (IOU) for bounding boxes, character level accuracy and field level accuracy on both text and position, etc.) and metrics based on reference data for data drift (e.g., distribution of number of predictions, OCR confidence and error rate, etc.). Model drift may be detected using metrics based on feedback, while data drift may be detected using metrics based on reference data.

In either case, when the ML model training phase is triggered in step 222, data for training (e.g., learning pairs) from the learning store repository may be retrieved in step 224. This may include, for example automatically collecting input images from original data extraction requests (e.g., original documents), the corresponding extracted data and user correction (production) feedback (e.g., validated data and bounding box co-ordinates) via the learning store repository and transfer the data for model training.

In step 228, data may be augmented (e.g., via data augmenter 136A) by correlating document images with its corresponding feedback on extracted data, and preprocessing both images and feedback into a format that can be used by model training. The feedback may be transformed into a labeled dataset for the document(s) that may be stored (e.g., storage 136D).

In step 230, the quality of labeled dataset is checked (e.g., using customized code with OCR comparison and heuristic rules) to remove invalid or corrupted images and labeling data that fails the quality check (e.g., via quality analyzer 136B). In a non-limiting example, the OCR check may include retrieving an OCR token, calculating the distance (e.g., Levenshtein distance) between the OCR text and labeling text from production feedback, and calculating differences between the OCR text and labeling from production feedback in terms of the computed distance. If the differences exceed certain thresholds, then the validated data from feedback may be identified as invalid.

In some examples, one or more heuristic sanity checks may also be performed. These may include a field coverage check to determine whether labeled images include enough desired fields. This may be achieved, for example, by counting the number of fields by field IDs in labeling. Blank or corrupted images may be identified by checking whether the image is blank by calculating the pixel density. After converting the image to grayscale, if pixel density is close to 0 or to 1, the page may be considered corrupted and therefore unusable. The system may then check whether the image is too noisy to be unrecognizable. This may be achieved, for example, by checking the OCR tokens. If the OCR tokens contains no text, then the document may be corrupted. As another example, an enumerated fields check may be used to determine whether enumerated fields have values other than a predefined list of values. For example, if a predefined list of fields can only have values as "Yes" or "No", but "True" or "False" or "Wildcard" shows up in labelling, then the labeling may be invalid. Orientation and deskew methods are other non-limiting example techniques that may also be implemented to correct the image. For example, if the image is upside-down or sideways, the methods rotate the image by the same amount as its skew but in the opposite direction so that it is horizontally and vertically aligned.

Data that does not pass the data quality check in step 230 may be discarded, if not enough samples are left, and step 230 may proceed to step 220. In some examples, information on the data that does not pass the data quality check may be stored for further analysis. However, data that passes the data quality check may proceed to step 232 and may be utilized for training purposes. Specifically, in step 232, the system may gather the remaining labeled dataset referred to as a sliver data folder. The system then automatically segments the data into multiple (e.g., three) parts. For example, a portion of the data may be saved as training data, a portion of the data may be saved for model evaluation, and another portion of the data may be saved for model validation.

In step 234, the system determines based on the sample size whether there are enough high-quality images and labeled dataset for a document type using a threshold that is configurable. If there are enough (i.e., sufficient number) high-quality samples, then the system proceeds to step 236. Otherwise, step 234 may proceed to step 220.

In step 236, the system determines if object detection (i.e., detection of check boxes, buttons, etc.) training should be part of the model training (e.g., via object detection analyzer 136C). If yes, the system prepares an object detection dataset and performs object detection model training in steps

238 and 240 (e.g., via model update/training module 142). If not, the system proceeds to step 242 where the data extraction model is trained. In either case, once object detection model and extraction model training is performed, the system generates a mapping file for calculating error rate in the future predictions in step 244 (e.g., via model update/training module 142).

For some documents, applying the data extraction model is enough to extract the data accurately. However, sometimes applying the data extraction model may not render accurate results when special entities are present in the document. It is noted that the object detection model is used to detect special entities in the document image such as checkboxes, radio buttons, copies, etc. Therefore, in some examples, the system may first use the object detection model to detect these special entities and prepare the special entities in a format that can be ingested by the data extraction model. For example, the object detection model may extract a radio button as a special character which can then be identified by the data extraction model. In other words, the special character identifies radio button and the radio button status. For example, if no object detection model is used, and a document includes a special entity such as a radio button, the radio button may be extracted as character "O" rather than "Unchecked". As another example, if no object model is used and extraction is being performed on a document (e.g., a W2 form) having multiple copies, the extraction may be inaccurate because the layout may become defective with different copies.

The system generates configurations for object detection models from labeled documents and uses training data to build object detection models. Hence, the model training can be completed without any human intervention. In a non-limiting example, the object detection models are a series of deep learning models that may be based on RetinaNet (e.g., a one-stage object detection model architecture that utilizes a focal loss function to address class imbalance during training). By using focal loss, for example, the model is accurate in detecting densely distributed objects, such as checkboxes or radio buttons. In general, the system may utilize any suitable deep learning model(s) to build the object detection model(s).

Sometimes documents can contain checkboxes and radio buttons. In this case, the system may return both text and bounding boxes. These various data elements may indicate field values. The field value may either be the status of whether the checkbox/radio button is checked or unchecked if the option is binary, or the actual text for the option if there are multiple options. For example, if the document includes Marital Status, and "Married" is selected, then the field name is "Marital Status", and the bounding box is the region around "Married", and the field value is "Married". If the document includes a checkbox "Does not apply" for mailing address, and the box is checked, then the field name "Mailing Address—Does Not Apply Indicator", and the bounding box is the region around the checkbox, and the field value is "Checked". In other words, the system can determine checkbox/radio button status and their associated text. This ensures that the information is easy to understand visually and suitable for use by downstream applications.

Object detection model training (step 240) may include constructing the model architecture including, for example, one or more of creating backbone architecture, specifying loss, optimizer and prediction functions, and configuring training parameters such as learning rate and number of epochs. As mentioned above, model training can be completed without any human intervention. If an object detection model is trained in steps 238 and 240, then the system also combines the object detection model with the data extraction model to generate a final data extraction model for extracting objects and text. Then the system may tune hyperparameters automatically based on model performance, for example, using a hyperparameter optimization tool. The system may then generate a final extraction model with optimal model performance.

In some examples, the data extraction models trained in step 242 may include a series of deep learning models that may be based on (without being limited to) LayoutLM (e.g., a neural network model architecture that utilizes transformer models for text embedding and position embedding). This model is suitable to extract information from documents based on text and layout. However, it is noted that the data extraction models in this disclosure are not limited to LayoutLM model, but may utilize any models that are most suitable for data extraction of specific document types.

Data extraction models may facilitate the return of key information for a particular document. The returned information may contain a field name (unique identifier for the field), a field value (text in the field), bounding box/snippet (the coordinates within which the field value exists in the image), field groups (a collection of fields that are logically associated with each other).

Data Extraction model training (in step 242) may include, for example, one or more of constructing the model architecture, including creating a backbone architecture, specifying loss, optimization, and prediction functions, configuring training parameters such as learning rate and number of epochs, creating wrappers to run sequence labeling on predicted results. The system may then load labeled documents and associated datasets and perform model training which eventually generates a data extraction model based on labeled data.

In some examples, the data extraction model training may utilize a hyperparameter optimization tool. This tool may be configured to determine a best (e.g., optimum) combination of parameters by using the most up-to-date hyperparameter search algorithms which natively support distributed training. Therefore, the hyperparameter optimization tool can be resource efficient and may render an optimum model performance.

In step 244, the system may use configurations and the evaluation samples to automatically calculate the error rate mapping file (e.g., JSON file). This file may be used later for dynamically calculating error rate and confidence level in production. The error rate mapping file may be used to convert a confidence score generated from the data extraction model(s) to an error rate. In one example, the error rate may be the probability that predictions of the model are wrong. In an example, the error rate may be determined as a matrix multiplication of confidence score (generated from data extraction model) and the error rate mapping file (generated in step 244, after model training). By using image and production feedback (e.g., labeled data), a matrix may be calculated that can map confidence to the probability of the predictions being correct (e.g., by comparing the prediction with the production feedback).

Figure 2C:
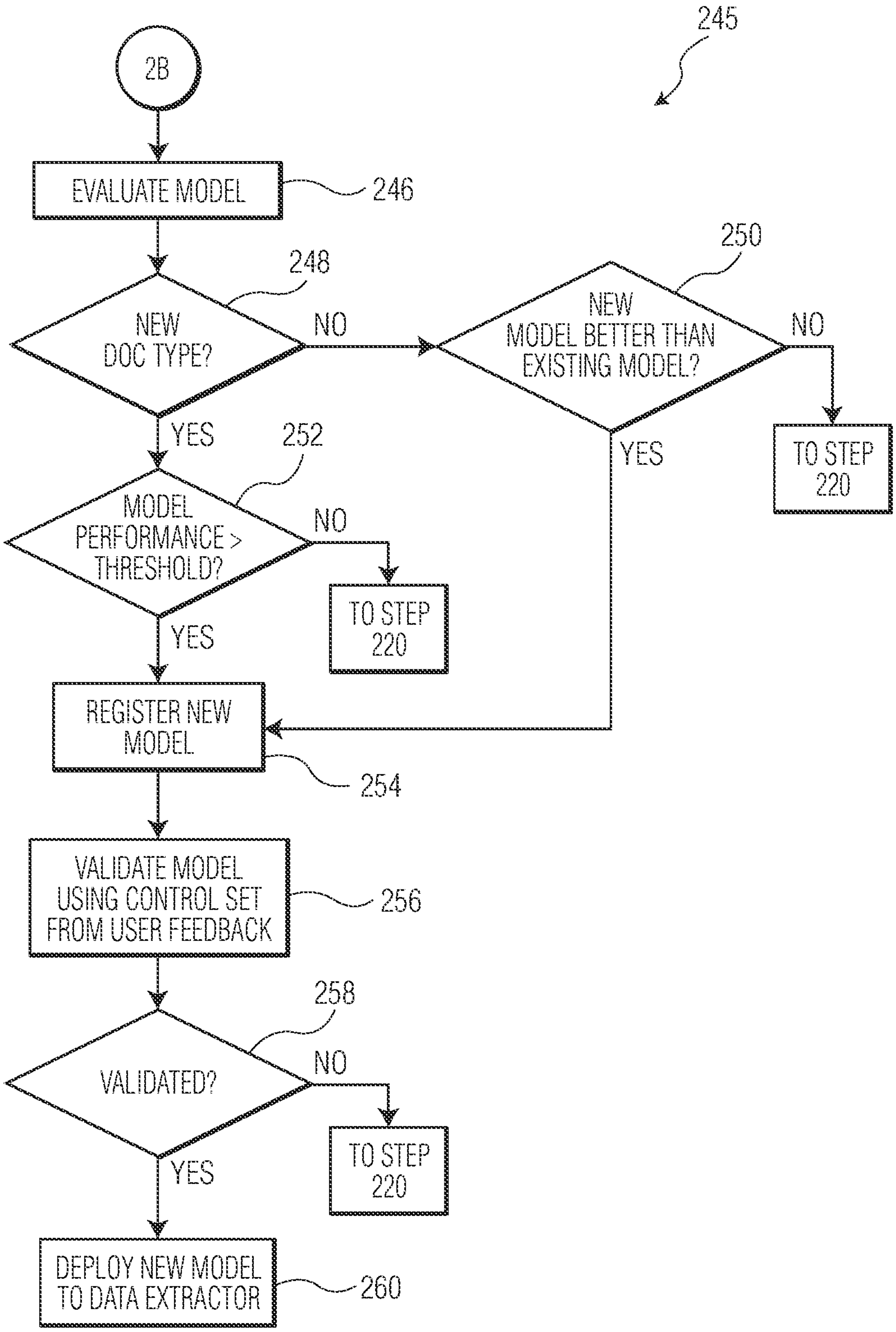
FIG. 2C is another flowchart diagram of an example machine learning model training and updating method for the data extraction system, according to an aspect of the present disclosure.

Now turning to FIG. 2C, flowchart diagram 245 illustrates an example of model evaluation for performance before the new data extraction model(s) may be deployed. In some examples, operations shown in flowchart diagram 245 may be performed by model development and adaptation system 132 in communication with ADE learning store 126 (and/or user devices 124) and automated data object extraction system 128.

For example, in step 246, the system may evaluate the performance of the trained data extraction model(s) (e.g., via performance evaluator 140). If the document used for training is determined to be a new document type in step 248, then model performance may be compared to a performance threshold in step 252. For example, the system may compare the model performance with one or more model performance metrics. If the performance meets the performance threshold, then the system proceeds to step 254 and registers the new model. If not, then the system proceeds to step 220. In some examples, information on the triggering of the rejection at step 252 may be stored for further analysis.

If the document used for training is not a new document type, then the model may also be compared to one or more existing models in step 250. If the new model is better than the existing deployed model according to the utilized metric, then the system proceeds to step 254 and registers the new model. If not, then the system proceeds to step 220. In some examples, information on the triggering of the rejection at step 250 may be stored for further analysis.

In step 256, the system then validates the model performance using a control set generated from user feedback (where the control set is not used during model training). The model may be evaluated on the control set to validate whether the model performance meets certain performance criteria. This step ensures model robustness when performing predictions on new data. Performance metrics may include, without being limited to accuracy (e.g., character-level accuracy) and/or automation level (e.g., field-level accuracy). Replacing existing models may include comparing the above metrics of the existing model to corresponding metrics of a new model, where the predetermined threshold relates to the performance of the existing model (e.g., new model criteria). As a non-limiting example, new model criteria (the predetermined threshold) may include greater than about 80% accuracy and greater than about 50% automation level. In this example, assume an existing model has an accuracy of 81% and an automation level of 51%. If a newly trained model is determined to have an accuracy of about 88% and an automation level of about 58%, then step 250 may proceed to step 254. If the model is determined to be validated in step 258, the new model is deployed at step 260. The deployed model replaces the existing model. If not, then the system proceeds to step 220. In some examples, information on the triggering of the rejection at step 258 may be stored for further analysis. In other words, the model is continually trained with new datasets until the performance meets the desired threshold.

In step 260, the system may automatically deploy the model as per the below non-limiting example process (e.g., via model deployer 138). The model generated from the previous steps may be packed as a tar bundle. Each tar bundle includes model data (e.g., model weight and biases, dependencies and inference code, etc.), as well as metadata of the model (e.g., model name, model version, suitable document types, docker image information, etc.) and configuration files (e.g., error rate file to calculate error rate). The tar bundle may then be sent to cloud storage while the folder name indicates the model and its version. Then the tar bundle may be used to construct a model hosted as a serverless auto-scaled endpoint, so that the backend system can make an API call to the model endpoint to make real-time predictions. The endpoint is then registered in the database of the back-end 104, so that the back-end 104 can choose which model endpoint to use for data extraction. The model performance of the newly trained model is monitored, as described in step 222, which triggers yet another training phase if the model performance drifts where data extraction performance falls below a threshold.

Figure 2D:
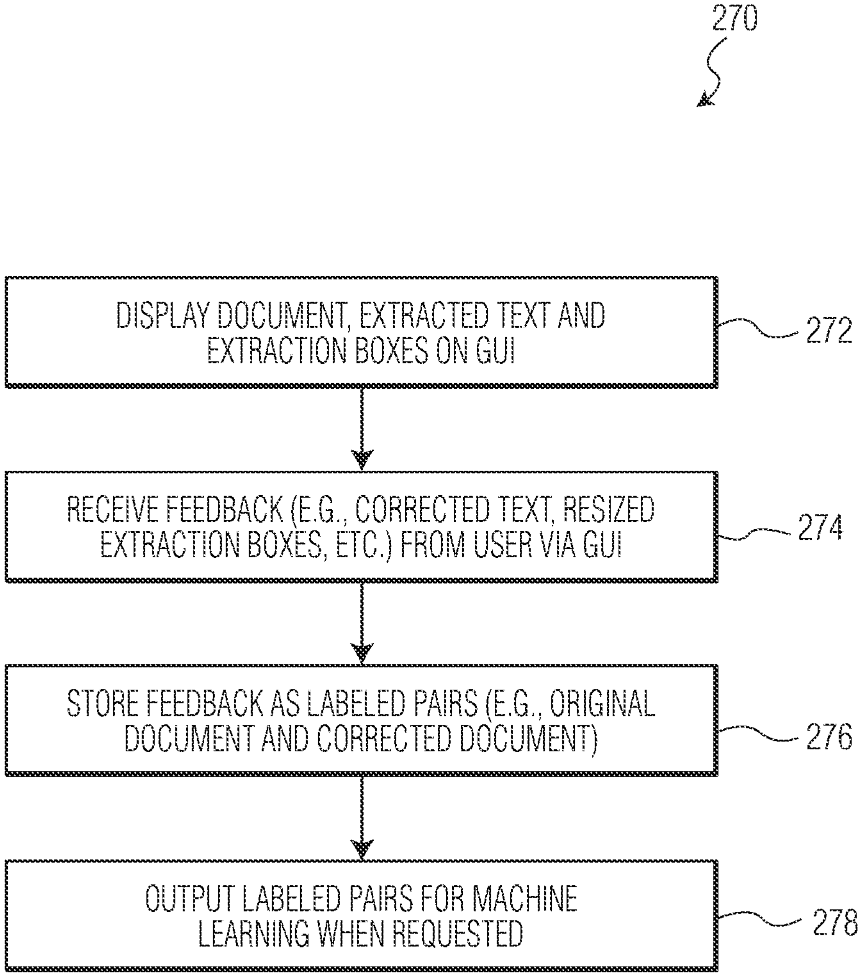
FIG. 2D is a flowchart diagram of example graphical user interaction (GUI) operation for the data extraction system, according to an aspect of the present disclosure.

Referring to FIG. 2D, a flowchart diagram 270 of example GUI operation for the data extraction system is shown, according to an aspect of the present disclosure. More specifically, FIG. 2D shows a method of generating training data via user input through the feedback GUI (e.g., 122A), for example, using user device(s) 124. In step 272, the smart ADE system extracts text and objects from the selected document which are then displayed on the feedback GUI. In step 274, the smart ADE system receives feedback from the user via the feedback GUI. This feedback may include corrected text, resized bounding boxes, etc. In step 276, the smart ADE system stores the feedback as labeled pairs (user correction feedback). In other words, the extracted document data and the corrected document data are stored in association with one another. Then, in step 278 the labeled pairs are output for ML training when requested. For example, when the system determines that the model has drifted, training is triggered, and the labeled pairs are retrieved.

Figure 3:
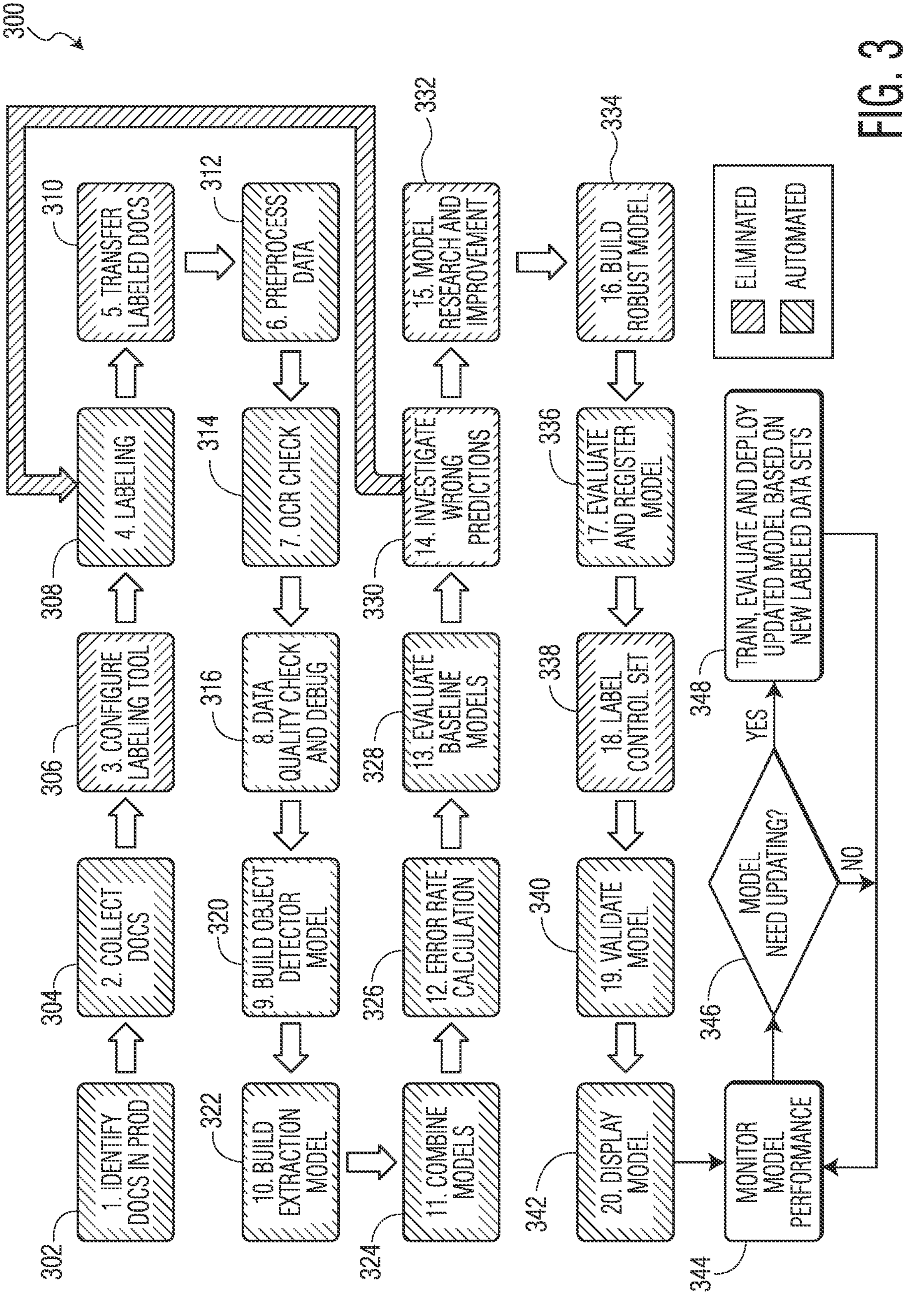
FIG. 3 is a flowchart diagram illustrating example system automation and efficiency for the data extraction system, according to an aspect of the present disclosure.

Referring to FIG. 3, a flowchart diagram 300 of system automation and efficiency for the data extraction system is shown, according to an aspect of the present disclosure.

In step 302, the smart ADE system identifies documents in production. Conventional methods necessitate a human to identify documents received in production (real-world samples) that can be used for model training. Such identification can be error-prone, as sometimes the user can mistakenly mix other document types with the samples. This process may unintentionally introduce bias in the selection that can affect model performance. The smart ADE system disclosed herein is automated as the document type is already known in production through production feedback. In other words, the users utilizing the smart ADE system benefit from automated document identification.

In step 304, the smart ADE system collects the documents in production. Conventional methods necessitate a human to manually download each document so that they can label the documents. The smart ADE system disclosed herein is automated as the data collection module automatically retrieves the document and user feedback as labeled dataset. In other words, the users utilizing the smart ADE system make corrections and these corrections along with the original document are used as the labeled dataset.

In step 306, conventional methods necessitate people to manually configure the labeling tool for different document types so that people can label these documents. The smart ADE system disclosed herein eliminates this step by design as the data collection module interacts with the front-end application which automatically configures the document labeling.

In step 308, the smart ADE system automates collection of labeled datasets. Conventional methods necessitate users to manually enter the text and draw bounding box for each and every field, one by one to create a labeled dataset. The smart ADE system disclosed herein automates this step using the production feedback from the data validation application. In other words, users using the smart ADE system provide the labeled dataset after correcting the errors in the data extraction.

In step 310, the smart ADE system automates the transfer of documents with labeled data to storage (e.g., a sandbox (i.e., an environment with copies of the documents)) for model training. Conventional methods necessitate documents and labeled dataset to be transferred manually. This usually takes a long time due to the large number of samples.

The smart ADE system disclosed herein eliminates this step by design as the data collection module is connected to the sandbox, so the samples are already copied to the sandbox after step 304. The batch mode during transfer, in the smart ADE system also enhances efficiency.

In step 312, the smart ADE system preprocesses the documents and labeled dataset. Conventional methods need documents and labeled dataset to be preprocessed manually. In the smart ADE system disclosed herein, this step is automated.

In step 314, the smart ADE system checks whether the labeled OCR is consistent with the OCR on the document. Conventional methods need documents and a labeled dataset to be checked manually. In the smart ADE system disclosed herein, this is automated.

In step 316, the smart ADE system checks the quality of image and labeling. Conventional methods need documents and labeling files to be reviewed manually, one by one, with limited samples to discover problematic images. In the smart ADE system disclosed herein, this is automated and done systematically, so that all invalid samples can be removed.

In steps 320 and 322, the smart ADE system builds object detection models and builds the data extraction models. Conventional methods utilize model training based on manual interaction. This step is error prone and burdensome as users are entering configurations manually. For example, users might be using the wrong document type or wrong labeled dataset address during model training or spending too much time tuning the model with all the combinations of hyperparameters. In the smart ADE system disclosed herein, object detection and data extraction model development are automatically triggered by completion of previous steps on the condition that there are enough high-quality samples for specific document types, and then determines what kind of models need to be trained and how data needs to be processed for the corresponding model. This expedites the process and eliminates manual error.

The smart ADE system also tunes hyperparameters. Conventional methods employ hyper parameter tuning manually. This step is inefficient and time consuming, as users attempt to try each combination of hyperparameters manually. For example, users might not exhaust all the combinations of hyperparameters and find the optimal combination of hyperparameters. In the smart ADE system disclosed herein, hyperparameter tuning is completed automatically by invoking the hyperparameter optimization tool. The hyperparameter optimization tool finds the best combination of parameters using the most up to date hyperparameter search algorithms and natively supports distributed training. Therefore, hyperparameter tuning in the smart ADE system disclosed herein is resource efficient and can render optimal model performance without any human intervention.

In step 324, the smart ADE system combines an object detection model and a data extraction model into a single model. Conventional methods combine these models manually. This step is error prone and burdensome as users enter configuration manually. For example, users might combine wrong models or wrong model versions. Meanwhile, in the smart ADE system disclosed herein, this process is automated. The automation expedites the process and avoids introducing manual error, because the configurations needed for this step are generated in previous steps.

In step 326, the smart ADE system calculates the error rate file (e.g., JSON file) using training samples. Conventional methods calculate error rate files manually. This step is error prone and burdensome as users enter configurations. For example, users may calculate the error rate of wrong models or the error rate of a wrong version of the correct model, or simply use the wrong file address. In the smart ADE system disclosed herein, this is automated, because this step is triggered by previous step without any human intervention. This expedites the process and avoids introducing manual error, because the configurations needed for this step are generated in previous steps.

In step 328, the smart ADE system evaluates the baseline model by calculating the weighted average of field accuracy, character-wise accuracy and confidence. Conventional methods require a user to evaluate models manually. This step is error prone and burdensome as users enter configurations manually. For example, users might evaluate the wrong models. In the smart ADE system disclosed herein, this is automated, because this step is triggered by previous steps without any human intervention. The configurations for this step are generated in previous steps. This expedites the process and avoids introducing manual error.

In steps 330 and 332, the smart ADE system may investigate incorrect predictions to determine why the model cannot predict accurately. If the issue is within labelling (step 308), then the method reverts back to step 308 and repeats steps 308 to 330 until the model performance reaches a performance threshold. Conventional methods necessitate manually investigating the incorrect predictions. This step is burdensome as users must check predictions and original images one by one with limited samples. If the issue is with the quality of the labeled dataset, then conventional methods also utilize manual labeling or relabeling and repeating of all steps needed for model training. In the smart ADE system disclosed herein, this step is optional, because model candidates are continuously developed and evaluated using a labeled dataset with good quality. Models that meet acceptance criteria are selected and proceed to the next steps automatically.

In steps 334, the smart ADE system builds robust model with model performance that meets predetermined acceptance criteria. Conventional methods employ model training and hyper parameter tuning, and then manually checking as to whether the robust model meets criteria. This step is error prone and burdensome as users enter configurations manually. For example, users might use wrong document type or wrong configuration during model training or spending too much time tuning the model with all the possible combinations of hyperparameters. In the smart ADE system disclosed herein, checking whether the model is robust or not is avoided because only models that meet acceptance criteria are selected and proceed to the next steps automatically, while building and tuning the model are automated.

In step 336, the smart ADE system deploys and registers the model in a registry. Conventional methods utilize manual model registration and deployment. This step is error prone and burdensome as users write code manually. For example, users might register or deploy incorrect or old models. In the smart ADE system disclosed herein, this is automated. The configurations for this step are either pre-defined or generated in previous steps. This expedites the process and avoids introducing manual error.

In step 338, conventional methods require steps 302-310 to prepare for a control set. In the smart ADE system disclosed herein, this is avoided by segregating the data generated in steps 302-310. This is possible because production feedback has a larger sample size than the labeled documents.

In step 340, the smart ADE system validates the model performance against acceptance criteria. Conventional methods perform model validation via manually written code and manually checking of results to determine whether the model can proceed to the next step. This step is error prone and burdensome as users enter configurations manually. In the smart ADE system disclosed herein, this is automated. The configurations needed for this step are generated in previous steps. This expedites the process and avoids introducing manual error.

In step 342, the smart ADE system deploys the model in production. Conventional methods utilize manual model deployment. In the smart ADE system disclosed herein, the deployment of models to production is automated. This expedites the process and avoids introducing manual error.

In step 344, the smart ADE system monitors model performance. If the model is determined, in step 346, to be operating properly, then no updating is performed. However, if the model is determined to benefit from updating due to model and/or data drift, the smart ADE system trains, evaluates and deploys an updated model in step 348 (e.g., by repeating the steps described in FIGS. 2B and 2C) based on new labeled datasets generated from user feedback. In other words, the training procedure may be repeated automatically as needed based on detected model and/or data drift.

Some examples of documents for data extraction are now described with reference to FIGS. 4A-4E.

Figure 4A:
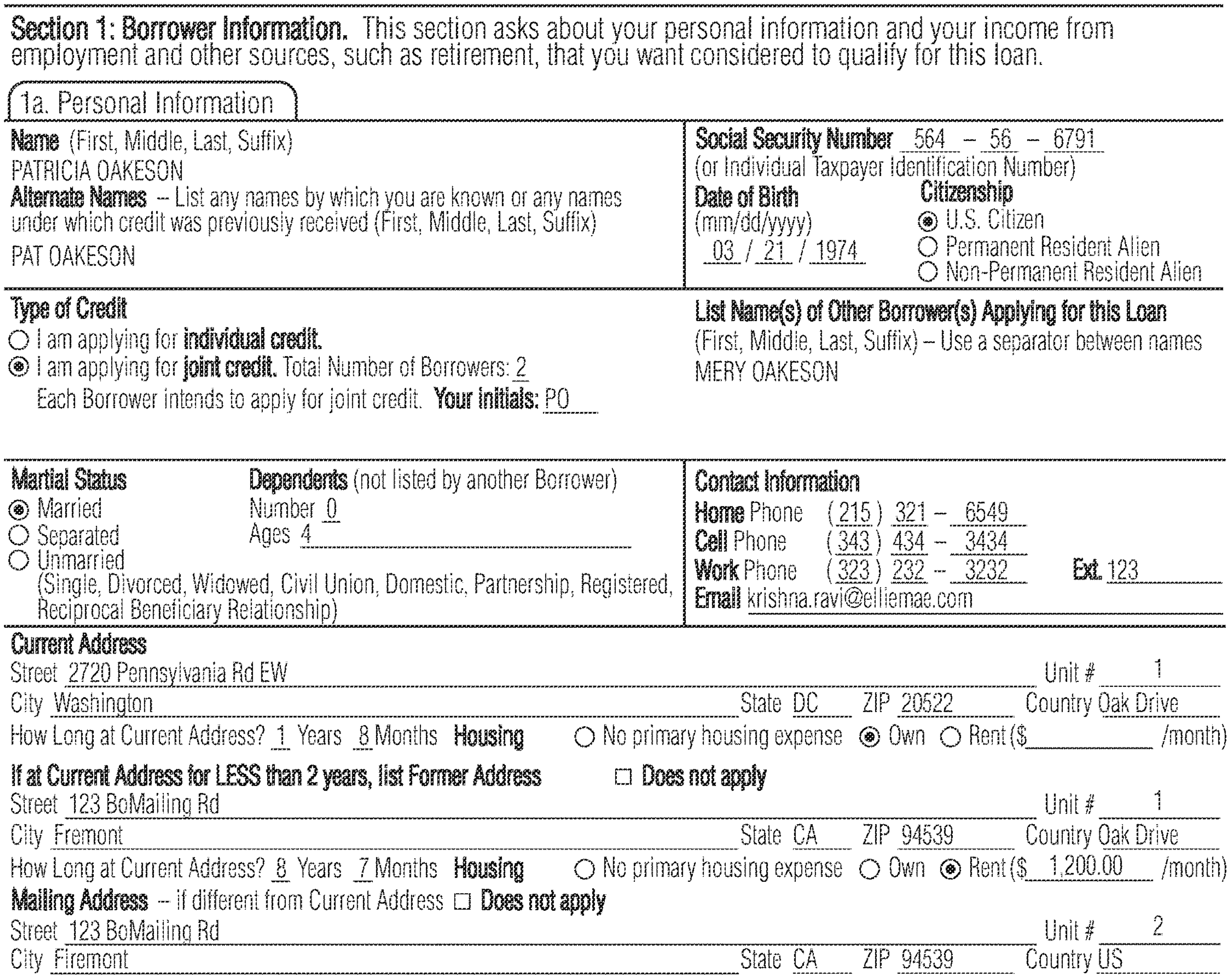

Referring to FIG. 4A, a screenshot of an example of a document portion 400 operated on by the data extraction system is shown, according to another aspect of the present disclosure. Document portion 400 in this example is part of a loan application image submitted for data extraction that includes text fields and check boxes for "Type of Credit", "Marital Status", "Current Address" and others, with example information being filled in on document portion 400. The smart ADE system may extract this information if the form is filled out (as shown in FIG. 4A).

Figure 4B:
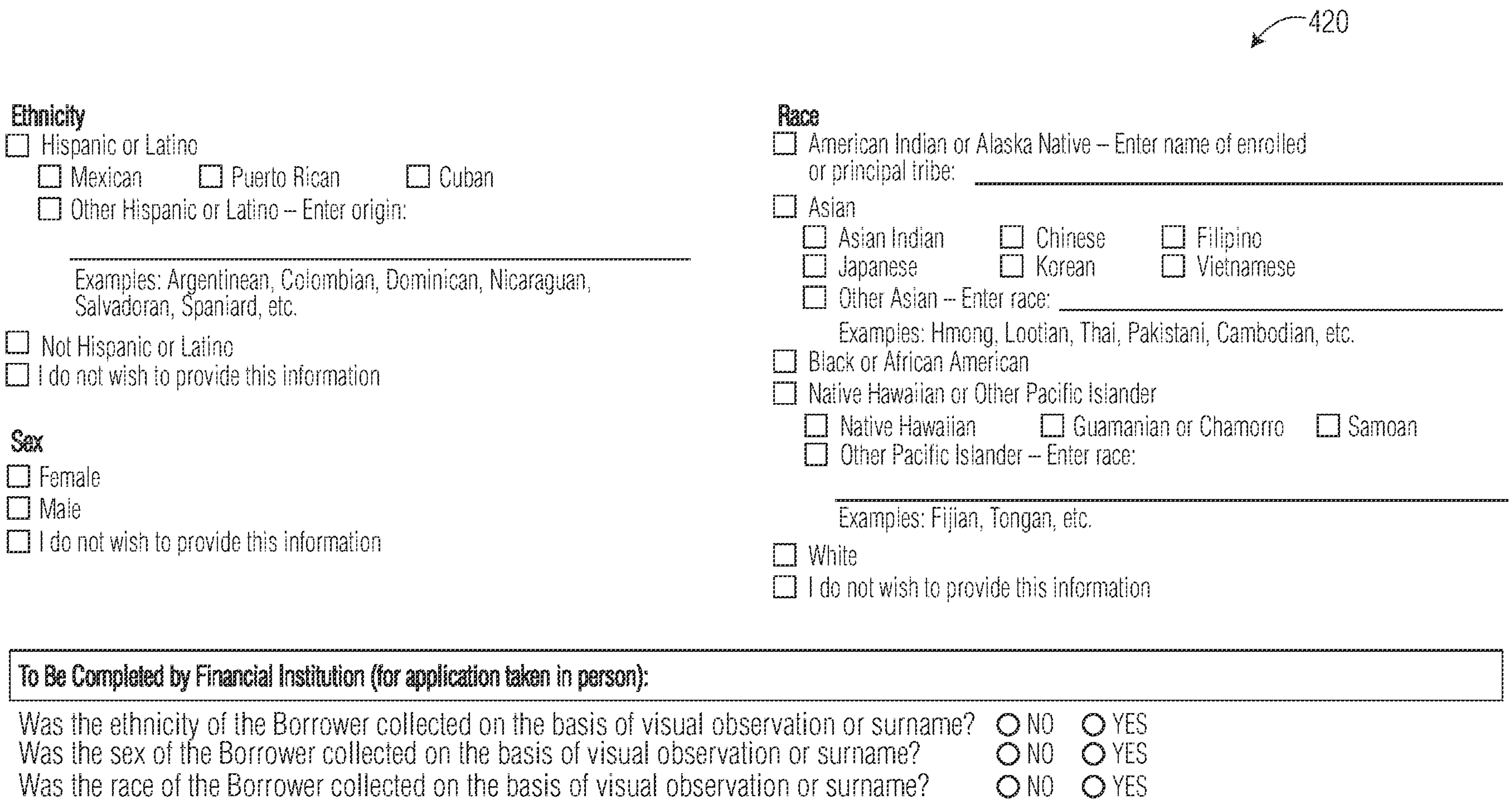

Referring to FIG. 4B, a screenshot of another example of a document portion 420 operated on by the data extraction system is shown, according to another aspect of the present disclosure. Document portion 420 in this example is part of an ethnicity survey that includes text fields and check boxes for "Ethnicity", "Race", "Sex" and others. Again, the smart ADE system may extract this information.

Referring to FIG. 4C, a screenshot of another example of a document portion 440 operated on by the data extraction system is shown, according to another aspect of the present disclosure. Document portion 440 in this example is part of an employee paystub that includes text fields for "Employee Name", "Earnings", "Taxes" and others. Again, the smart ADE system may extract this information.

Referring to FIG. 4D, a screenshot of another example of a document portion 460 operated on by the data extraction system is shown, according to another aspect of the present disclosure. Document portion 460 in this example is part of a notarized acknowledgment form that includes text fields for "State", "County", "Signature" and others. Again, the smart ADE system may extract this information.

Figure 4E:
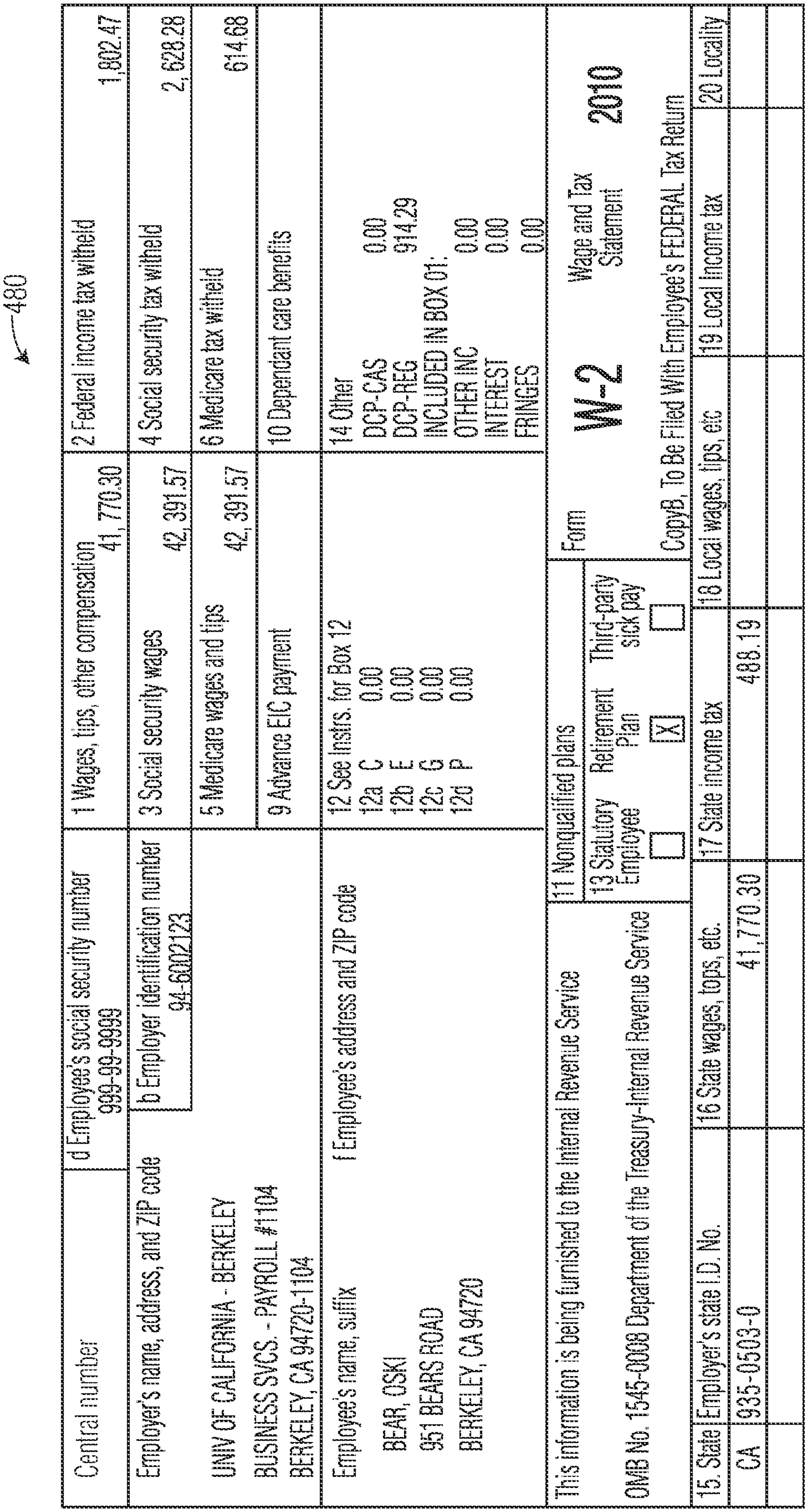

Referring to FIG. 4E, a screenshot of another example of a document portion 480 operated on by the data extraction system is shown, according to another aspect of the present disclosure. Document portion 480 in this example is part of a W2 form that includes text fields for "Employer's Name", "Employee's Name", "Wages" and others. Again, the smart ADE system may extract this information.

The documents in FIGS. 4A-4E are just some examples of documents that can be input to the smart ADE system for data extraction. The smart ADE system can use the object detection model, for example, to, extract information of checkboxes and/or radio buttons that are checked or unchecked and detect signatures to determine if they are Present or Not Present; and their corresponding bounding box(es); and use the data extraction model to extract alphanumerical characters from the documents and special characters representing the objects detected by the object detection model. The documents may be populated by the end user electronically, or filled in manually by the end user and scanned into the system. In general, the data may be extracted from an image, irrespective of the manner in which the document was completed and the format in which it was originally received.

FIGS. 5A-5D show examples of the interactive GUI that is configured to display the document (e.g., a financial application document) and the extracted data of the document to the user, according to an aspect of the present disclosure. As will be described, the interactive GUI allows the user to confirm that the smart ADE system accurately extracted the data from the document. The ADE system also allows the user to make corrections to the extracted data and bounding boxes if the data and/or bounding box(s) is incorrect. These corrections are then used by the smart ADE system during initial or subsequent model development. It should be understood that FIGS. 5A-5D represent a non-limiting example user interface, and that a differing interface configured in accordance with this disclosure may be provided for viewing and editing extracted data documents.

Figure 5A:
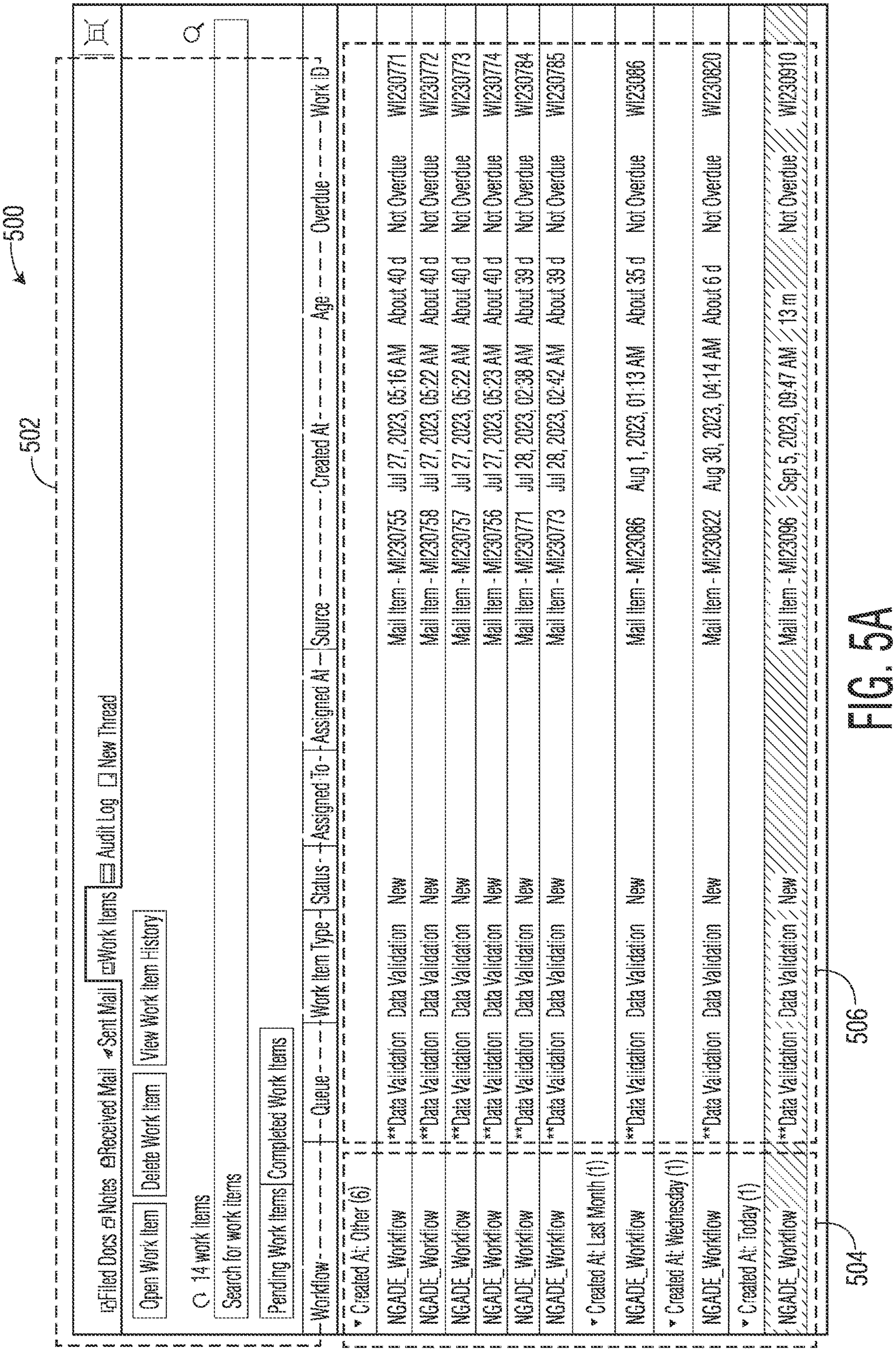
FIG. 5A is a screenshot of an example interactive GUI displaying a list of documents operated on by the data extraction system, according to another aspect of the present disclosure.

Referring to FIG. 5A, a screenshot 500 of an interactive GUI displaying a list of documents operated on by the data extraction system is shown, according to another aspect of the present disclosure. In general, the user may access the data validation application and view the work items that need to be validated. Each work item may contain one or more documents. For example, window 502 shows a menu of options for accessing the documents in the system. Window 504 shows a list of the pending work items (e.g., file names, etc.), and window 506 shows details regarding the pending work items (e.g., requested tasks, status, creation times, due dates, etc.). In some examples, the user may be an ADE data extraction specialist tasked to review and validate data extraction results or an administrator of the smart ADE system as mentioned above. In FIG. 5A, a selected work items may be highlighted as depicted by the hatch lines.

Figure 5B:
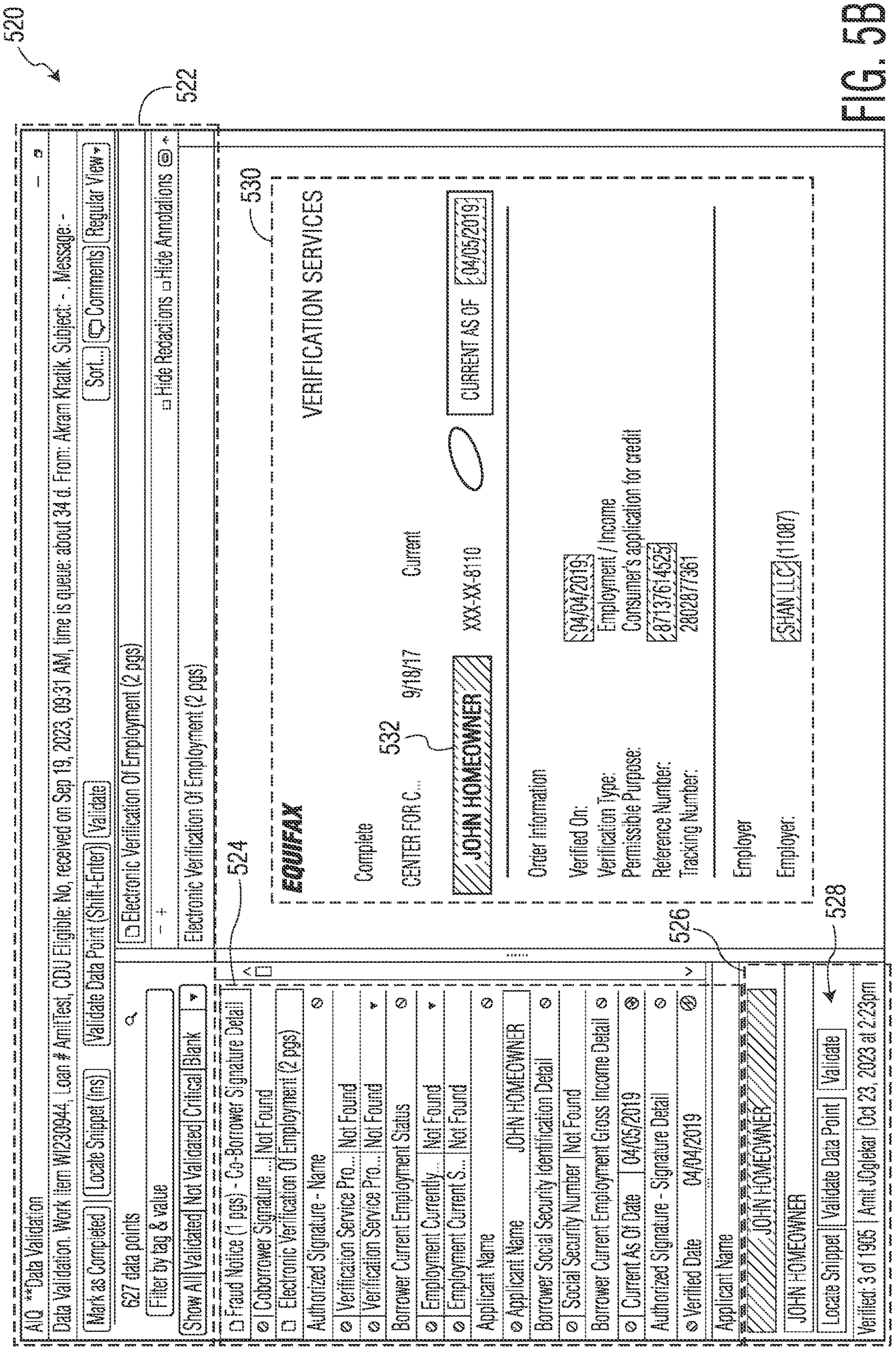
FIG. 5B is a screenshot of an example interactive GUI displaying a document and corresponding data extracted by the data extraction system, according to another aspect of the present disclosure.
Figure 5C:
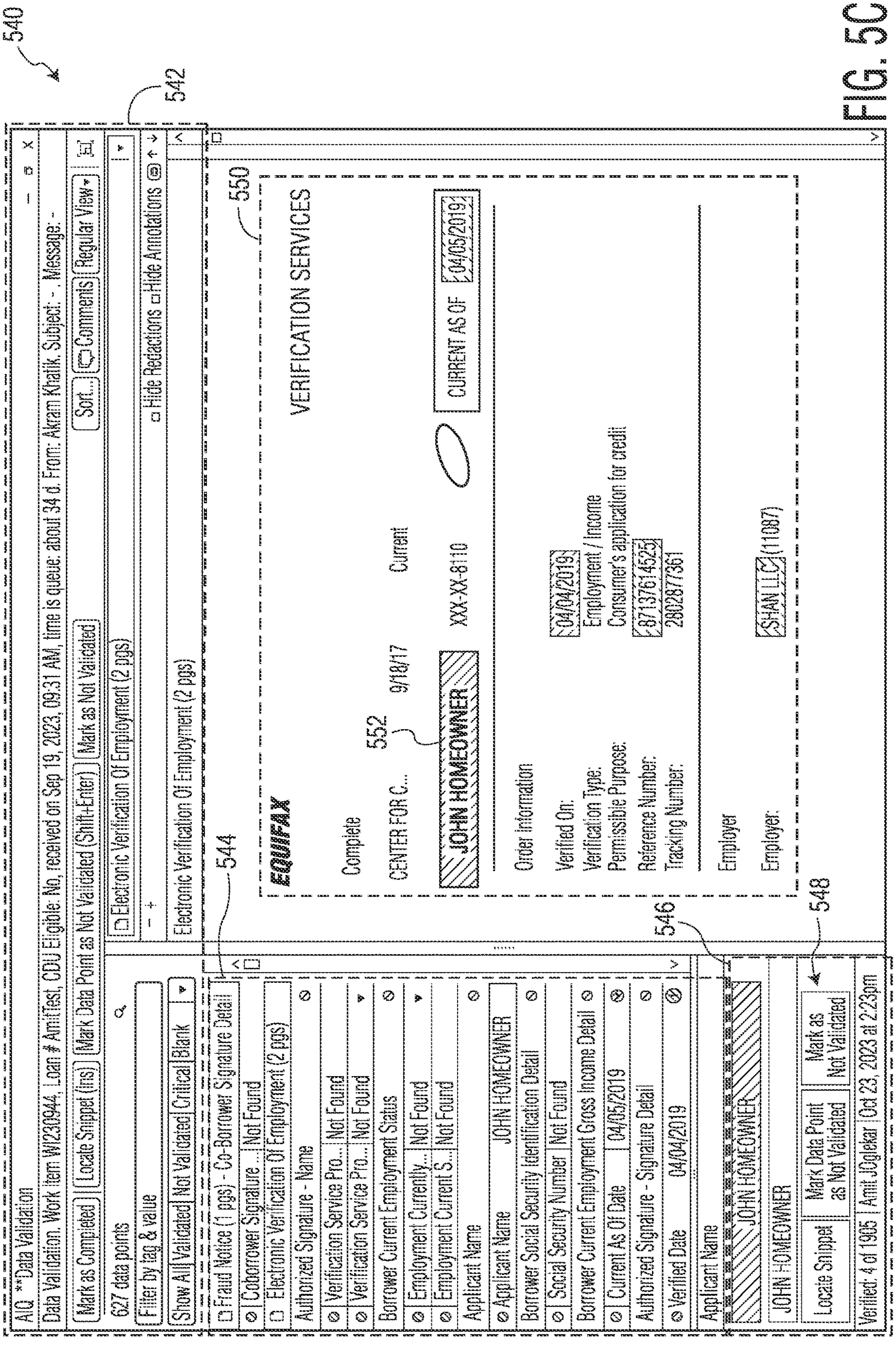
FIG. 5C is a screenshot of an example interactive GUI displaying corrections made to the document and corresponding data shown in FIG. 5B, according to another aspect of the present disclosure.

Referring to FIG. 5B, a screenshot 520 of an interactive GUI displaying a document and corresponding data extracted by the data extraction system is shown, according to another aspect of the present disclosure. After the user selects a work item in FIG. 5A, the field values of data extraction results appear on the left panel 524, and the bounding boxes are used to show the actual positions of the fields on the page on the right panel 530. The fields may be highlighted a certain color (e.g., yellow as depicted by the right slanting hatch lines) to indicate that they are not yet validated, or highlighted in a different color (e.g., green as depicted by the left slanting hatch lines as shown in FIG. 5C) to indicate that they are validated. A menu may be visible in window 522 indicating information or options relevant to the selected document. When the user scrolls down each field in 524 and clicks on an entry, the corresponding text is highlighted within the coordinates of the bounding box on 532, and window 526 is populated with extracted text. The user is then able to validate the text if the text is accurate or modify the text to make corrections if the text is inaccurate. In one example, the user is able press one or more of buttons 528 to locate the target text in panel 530 and validate the text either with or without modifications.

Referring to FIG. 5C, a screenshot 540 of an interactive GUI displaying corrections made to the extracted data/bounding boxes is shown, according to another aspect of the present disclosure. Similar to FIG. 5B, a menu may be visible in window 542 indicating information or options relevant to the selected document. When reviewing the extracted data and bounding boxes for accuracy, the user views the field values in 544 and bounding boxes in 552 for each extracted field and confirms if the field value is extracted correctly and if the bounding box co-ordinates accurately identify the field position. Incorrect field values and/or bounding boxes are corrected by the user. For example, if a field value in window 544 is incorrect, the user clicks into the field and corrects the text displayed in panel 546 to the appropriate value. Likewise, if the bounding box 552 in panel 550 has an inaccurate position or dimensions, the user clicks the box and moves or resizes that box in panel 550 to the appropriate position and dimensions. In other words, the user corrects any mistakes in the extracted data and corrects the location from where the data is being extracted. These corrections effectively produce training data for the ADE system. The ADE system may use the original document along with the corrections in 544 and 548 as a labeled pair of training data to be used when the model monitoring and/or training is triggered where original/corrected text can be compared and original/corrected bounding boxes can be compared. It is noted that the user may validate the entries and bounding boxes by clicking one or more buttons 548 in panel 546. Buttons 548 may also include buttons for invalidating entries that were incorrectly validated by the user. Once validated by the user, the fields may be highlighted a certain color (e.g., green) to indicate that they are already validated. Again, the fields may be highlighted a certain color (e.g., yellow as depicted by the right slanting hatch lines) to indicate that they are not yet validated, or highlighted in a different color (e.g., green as depicted by the left slanting hatch lines) to indicate that they are validated.

Figure 5D:
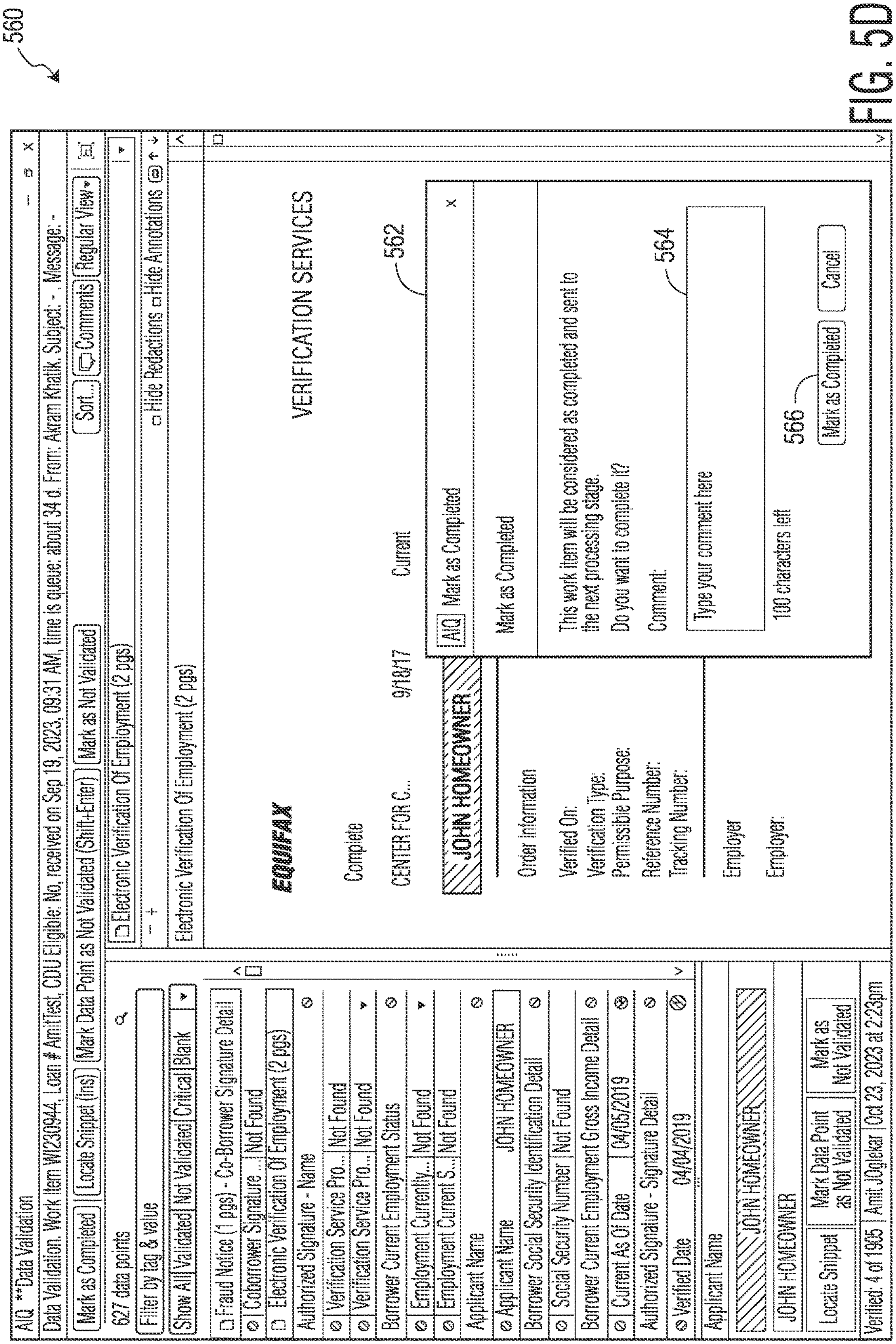
FIG. 5D is a screenshot of an example interactive GUI displaying confirmation of the corrections made to the document and corresponding data shown in FIG. 5C, according to another aspect of the present disclosure.

Referring to FIG. 5D, a screenshot 560 of an interactive GUI displaying confirmation of the corrections made to the document and corresponding data is shown, according to another aspect of the present disclosure. After the corrections are made in FIG. 5C, the user may wish to exit the document. Upon exiting, the system prompts the user with pop-up window 562 to confirm that the corrections are complete. The user can also add comments in window 564 with respect to the corrections before clicking button 566 to mark the document as completed. In either case, once the user confirms that the document has been corrected, the system removes the document from the task list and stores the original document in 520 along with the corrections in 540 as a labeled pair of training data to be used when the model training is triggered.

The ADE system described above, includes specialized system components and methods that are used to improve the speed and efficiency through data parallelization during model training, which reduces the model training time and efforts, hyper-parameter optimization tools that improve the performance during hyper parameter tuning process, automatic jobs to parallelize the model training for different document types, automated quality checks and sample size checks to train the model when there is enough (i.e., sufficient amount) high-quality data (improves computational resource utilization), and data cleaning methods to discard data and models that failed to meet acceptance criteria.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some examples, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions by the machine and that causes the machine to perform any one or more of the methodologies of the present disclosure.

Referring to FIG. 6, an example computer system 600 is shown for executing the data extraction system of the present disclosure. The system is shown in the form of computer system 600 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components of computing environment 100, such as data entry terminals 102B/102C, repository 102A and server(s) 104A may be implemented by a specialized machine, particularly programmed to perform certain functions, such as the example machine shown in FIG. 6 (or a combination of two or more of such machines).

Example computer system 600 may include processing device 602, memory 606, data storage device 610 and communication interface 612, which may communicate with each other via data and control bus 618. In some examples, computer system 600 may also include display device 614 and/or user interface 616.

Processing device 602 may include, without being limited to, a microprocessor, a central processing unit, an application-specific integrated circuit (ASIC), a field programmable gate array (FPGA), a digital signal processor (DSP) and/or a network processor. Processing device 602 may be configured to execute processing logic 604 for performing the operations described herein. Processing device 602 may include a special-purpose processing device specially programmed with processing logic 604 to perform the operations described herein.

Memory 606 may include, for example, without being limited to, at least one of a read-only memory (ROM), a random-access memory (RAM), a flash memory, a dynamic RAM (DRAM) and a static RAM (SRAM), storing computer-readable instructions 608 executable by processing device 602. Memory 606 may include a non-transitory computer readable storage medium storing computer-readable instructions 608 executable by processing device 602 for performing the operations described herein. For example, computer-readable instructions 608 may include operations performed by the components of computing environment 100, including operations shown in FIGS. 2A-5D. Although one memory device 606 is illustrated in FIG. 6, in some examples, computer system 600 may include two or more memory devices (e.g., dynamic memory and static memory).

Computer system 600 may include communication interface 612, for direct communication with other computers (including wired and/or wireless communication) and/or for communication with a network. In some examples, computer system 600 may include display device 614 (e.g., a liquid crystal display (LCD), a touch sensitive display, etc.). In some examples, computer system 600 may include user interface 616 (e.g., an alphanumeric input device, a cursor control device, etc.).

In some examples, computer system 600 may include data storage device 610 storing instructions (e.g., software) for performing any one or more of the functions described herein. Data storage device 610 may include a non-transitory computer-readable storage medium, including, without being limited to, solid-state memories, optical media and magnetic media.

While the present disclosure has been discussed in terms of certain examples, it should be appreciated that the present disclosure is not so limited. The examples are explained herein by way of example, and there are numerous modifications, variations and other examples that may be employed that would still be within the scope of the present disclosure.

The invention claimed is:

1. A system comprising:

one or more databases configured to store one or more documents of a specified type of document together with data automatically extracted from each document via at least one extraction model for the specified type of document, the at least one extraction model comprising a machine learning (ML) model; and at least one server operatively coupled to the one or more databases, the at least one server comprising one or more processors and a memory storing computer-readable instructions executable by the one or more processors, the memory storing the at least one extraction model, the at least one server configured to:

generate an interactive graphical user interface (GUI) on at least one user device, the interactive GUI configured to display, for a document of the one or more documents, said document together with one or more extracted data indications associated with the respective extracted data and user interaction tools to indicate any user correction information associated with the one or more extracted data indications, the interactive GUI comprising an extraction region configured to display one or more fields of the extracted data, and a document region configured to display the document and bounding boxes used to define the extraction region, receive, via the user interaction tools of the interactive GUI, from the at least one user device, user correction information associated with at least one field among the one or more fields of the extraction region to form training data, the user correction information including: forming corrected bounding boxes by correcting one or more of the bounding boxes used to define the extraction region and forming corrected data by correcting the extracted data for at least one field among the one or more fields, store, in the one or more databases, the user correction information forming the training data received from the at least one user device via the user interaction tools of the interactive GUI for the one or more documents, such that each of the one or more documents, the respective extracted data and the corresponding user correction information form an extracted document dataset, each extracted document dataset being updated as corresponding new user correction information is received, monitor, in real-time, performance characteristics of the at least one extraction model based on the user correction information in each extracted document dataset, stored in the one or more databases, execute an automated extraction model update process, comprising:

determine a status of a trigger for extraction model training, wherein the trigger is based on the performance characteristics of the at least one extraction model, augment the training data by correlating images from the specified type of document with the user correction information corresponding to the images from the specified type of document, and preprocessing both the images and the user correction information to form a labeled dataset having a format compatible with model training, determine that the labeled dataset is of a threshold quantity and of a predetermined data quality for extraction model training, wherein the determining that the labeled dataset is of the predetermined data quality comprises calculating a distance between the extracted data and the user correction information associated with the at least one field among the one or more fields of the extraction region, determining that the distance is within a threshold distance, and determining the labeled dataset includes a desired number of fields, and responsive to the status of the trigger indicating that the performance characteristics of the at least one extraction model are below a predefined threshold, and that the labeled dataset is of the threshold quantity and the predetermined data quality:

extract the labeled dataset of the specified type of document from the one or more databases, and automatically update and train the at least one extraction model using the labeled dataset to form at least one new extraction model, the at least one new extraction model being used for executing subsequent data extraction operations for the specified type of document.

2. The system of claim 1, wherein the at least one server is configured to periodically trigger the automatic updating and training of the at least one extraction model.

3. The system of claim 1, wherein the at least one server is configured to execute the ML model as a combined transformer model for extracting data in the document based on text and layout, and an object detection model for detecting objects in the document.

4. The system of claim 3, wherein the detected objects include at least one of radio buttons, check boxes and signatures in the document.

5. The system of claim 1, wherein the at least one server is configured to create the one or more extracted data indications associated with the document based on data to be included in the document.

6. The system of claim 1, wherein the at least one server is configured to create the ML model for the specified type of document.

7. The system of claim 1, wherein the at least one server is configured to create a plurality of machine learning models and select one of the plurality of machine learning models based on a type of document being analyzed.

8. The system of claim 1, wherein the at least one server is configured to:

compute a performance of the updated model; and execute the updated model for subsequent predictions of data for subsequent documents in response to the performance of the updated model exceeding a performance threshold.

9. The system of claim 1, wherein the at least one server is configured to:

automatically update and train the at least one extraction model based on the labeled dataset.

10. The system of claim 1, wherein the at least one server is configured to:

replace the at least one extraction model with the at least one new extraction model when the at least one new extraction model meets predetermined evaluation characteristics, wherein the predetermined evaluation characteristics include at least one of model drift and data drift.

11. The system of claim 1, wherein the ML model comprises a neural-networked based ML model.

12. The system of claim 1, wherein the at least one server is configured to display, in the interactive GUI, the bounding boxes around the extracted data within the document.

13. The system of claim 12, wherein the at least one server is configured to receive, via the interactive GUI of the at least one user device, user input correcting dimensions of the bounding boxes to form the training data.

14. The system of claim 12, wherein the at least one server is configured to display, via the interactive GUI of the at least one user device, the one or more fields of the extracted data as editable text, and the bounding boxes as resizable boxes.

15. A method comprising:

storing, by one or more databases, one or more documents of a specified type of document together with data automatically extracted from each document via at least one extraction model for the specified type of document, the at least one extraction model comprising a machine learning (ML) model;

generating, by at least one server, an interactive graphical user interface (GUI) on at least one user device, the interactive GUI configured to display, for a document of the one or more documents, said document together with one or more extracted data indications associated with the respective extracted data and user interaction tools to indicate any user correction information associated with the one or more extracted data indications, the at least one server being operatively coupled to the one or more databases, the at least one server comprising one or more processors and a memory storing computer-readable instructions executable by the one or more processors, the memory storing the at least one extraction model, the interactive GUI comprising an extraction region configured to display one or more fields of the extracted data, and a document region configured to display the document and bounding boxes used to define the extraction region;

receiving, by the at least one server, via the user interaction tools of the interactive GUI, from the at least one user device, user correction information associated with at least one field among the one or more fields of the extraction region to form training data, the user correction information including: forming corrected bounding boxes by correcting one or more of the bounding boxes used to define the extraction region and forming corrected data by correcting the extracted data for at least one field among the one or more fields;

storing, by the at least one server, in the one or more databases, the user correction information forming the training data received from the at least one user device via the user interaction tools of the interactive GUI for the one or more documents, such that each of the one or more documents, the respective extracted data and the corresponding user correction information form an extracted document dataset, each extracted document dataset being updated as corresponding new user correction information is received;

monitoring, by the at least one server, in real-time, performance characteristics of the at least one extraction model based on the user correction information in each extracted document dataset, stored in the one or more databases;

executing an automated extraction model update process, comprising:

determining, by the at least one server, a status of a trigger for extraction model training, wherein the trigger is based on the performance characteristics of the at least one extraction model;

augmenting, by the at least one server, the training data by correlating images from the specified type of document with the user correction information corresponding to the images from the specified type of document, and preprocessing both the images and the user correction information to form a labeled dataset having a format compatible with model training;

determining, by the at least one server, that the labeled dataset is of a threshold quantity and of a predetermined data quality for extraction model training, wherein the determining that the labeled dataset is of the predetermined data quality comprises calculating a distance between the extracted data and the user correction information associated with the at least one field among the one or more fields of the extraction region, determining that the distance is within a threshold distance, and determining the labeled dataset includes a desired number of fields; and responsive to the status of the trigger indicating that the performance characteristics of the at least one extraction model are below a predefined threshold, and that the labeled dataset is of the threshold quantity and the predetermined data quality:

extracting, by the at least one server, the labeled dataset of the specified type of document from the one or more databases, and automatically updating and training, by the at least one server, the at least one extraction model using the labeled dataset to form at least one new extraction model, the at least one new extraction model being used for executing subsequent data extraction operations for the specified type of document.

16. The method of claim 15, further comprising:

periodically triggering, by the at least one server, the automatic updating and training of the at least one extraction model.

17. The method of claim 15, further comprising:

executing, by the at least one server, the ML model as a combined transformer model for extracting data in the document based on text and layout, and an object detection model for detecting objects in the document.

18. The method of claim 17, wherein the detected objects include at least one of radio buttons, check boxes and signatures in the document.

19. The method of claim 15, further comprising:

creating, by the at least one server, the one or more extracted data indications associated with the document based on data to be included in the document.

20. The method of claim 15, further comprising:

creating, by the at least one server, the ML model for the specified type of document.

21. The method of claim 15, further comprising:

creating, by the at least one server, a plurality of machine learning models and selecting one of the plurality of machine learning models based on a type of document being analyzed.

22. The method of claim 15, further comprising:

computing, by the at least one server, a performance of the updated model; and executing, by the at least one server, the updated model for subsequent predictions of data for subsequent documents in response to the performance of the updated model exceeding a performance threshold.

23. The method of claim 15, further comprising:

automatically updating and training, by the at least one server, the at least one extraction model based on the labeled dataset.

24. The method of claim 15, further comprising:

replacing, by the at least one server, the at least one extraction model with the at least one new extraction model when the at least one new extraction model meets predetermined evaluation characteristics, wherein the predetermined evaluation characteristics include at least one of model drift and data drift.

25. The method of claim 15, wherein the ML model comprises a neural-networked based ML model.

26. The method of claim 15, further comprising:

displaying, by the at least one server, in the interactive GUI, the bounding boxes around the extracted data within the document.

27. The method of claim 17, further comprising:

receiving, by the at least one server, via the interactive GUI of the at least one user device, user input correcting dimensions of the bounding boxes to form the training data.

28. The method of claim 17, further comprising:

displaying, by the at least one server, via the interactive GUI of the at least one user device, the one or more fields of the extracted data as editable text, and the bounding boxes as resizable boxes.

* * * * *